(12) United States Patent
Sivakumar et al.

(10) Patent No.: US 10,055,703 B2
(45) Date of Patent: Aug. 21, 2018

(54) FACTORY MANAGEMENT SYSTEM

(71) Applicant: Accenture Global Services Limited, Dublin (IE)

(72) Inventors: Srinivasan Sivakumar, Chennai (IN); Rajendra T. Prasad, Bangalore (IN); Vijayaraghavan Koushik, Chennai (IN); Parikshit Maniar, Bangalore (IN); Raghu R. Polisetty, Telangana (IN); Ganesh Mariappan, Chennai (IN); Senthil Kumar Jeyachandran, Chennai (IN); Bhaskar Ghosh, Bangalore (IN); Ittoop J. Kurian, Glashütten (DE)

(73) Assignee: Accenture Global Services Limited, Dublin (IE)

( * ) Notice: Subject to any disclaimer, the term of this patent is extended or adjusted under 35 U.S.C. 154(b) by 883 days.

(21) Appl. No.: 14/595,796

(22) Filed: Jan. 13, 2015

(65) Prior Publication Data
US 2016/0203434 A1 Jul. 14, 2016

(51) Int. Cl.
*G06Q 10/00* (2012.01)
*G06Q 10/06* (2012.01)
*G06Q 50/04* (2012.01)

(52) U.S. Cl.
CPC .. *G06Q 10/063118* (2013.01); *G06Q 10/0631* (2013.01); *G06Q 10/06316* (2013.01);
(Continued)

(58) Field of Classification Search
CPC .......................................... G06Q 10/00–50/00
(Continued)

(56) References Cited

U.S. PATENT DOCUMENTS

| 4,875,162 A | * | 10/1989 | Ferriter | G06F 17/50 700/97 |
| 4,937,743 A | * | 6/1990 | Rassman | G06Q 10/06 705/7.22 |

(Continued)

FOREIGN PATENT DOCUMENTS

JP 09311795 A * 12/1997

OTHER PUBLICATIONS

Lenz, "An Introduction to Software Factories," DZone: Smart Content for Tech Professionals, http://architects.dzone.com/articles/an-introduction-software-facto, Jun. 17, 2008, 10 pages.
(Continued)

*Primary Examiner* — Alan S Miller
(74) *Attorney, Agent, or Firm* — Harrity & Harrity, LLP

(57) ABSTRACT

A device may receive information associated with a work request. The device may identify a work profile, associated with a group of tasks to perform, and a group of task profiles, associated with estimating a resource demand for performing the group of tasks by a group of resources. The device may generate, based on the work profile and the group of task profiles, a plan identifying the group of tasks, an order for performing the group of tasks, and an estimated resource demand associated with performing the tasks. The device may provide, to a resource device associated with the group of resources, an assignment identifying a task from the group of tasks; may receive, from the resource device, a completion update identifying a completion status associated with the task; may update status information based on the completion update; and may output a status update based on the status information.

20 Claims, 18 Drawing Sheets

(52) U.S. Cl.
CPC ........... *G06Q 10/063112* (2013.01); *G06Q 10/063114* (2013.01); *G06Q 50/04* (2013.01); *Y02P 90/30* (2015.11)

(58) Field of Classification Search
USPC .............................................. 705/7.11–7.42
See application file for complete search history.

(56) References Cited

U.S. PATENT DOCUMENTS

| | | | | |
|---|---|---|---|---|
| 5,093,794 | A * | 3/1992 | Howie | G06Q 10/06 700/100 |
| 5,231,567 | A * | 7/1993 | Matoba | G05B 19/41865 700/100 |
| 5,596,502 | A * | 1/1997 | Koski | G06Q 10/06 700/95 |
| 5,630,070 | A * | 5/1997 | Dietrich | G06Q 10/06 705/7.23 |
| 5,826,040 | A * | 10/1998 | Fargher | G05B 19/41865 705/7.24 |
| 5,826,236 | A * | 10/1998 | Narimatsu | G06Q 10/06 705/7.24 |
| 5,890,134 | A * | 3/1999 | Fox | G06Q 10/06 700/100 |
| 6,073,107 | A * | 6/2000 | Minkiewicz | G06Q 10/06 705/28 |
| 6,278,901 | B1 * | 8/2001 | Winner | G06Q 10/06 700/100 |
| 6,393,332 | B1 * | 5/2002 | Gleditsch | G06Q 10/06 700/100 |
| 6,938,240 | B2 * | 8/2005 | Charisius | G06Q 10/06 717/102 |
| 6,985,872 | B2 * | 1/2006 | Benbassat | G06Q 10/06 705/320 |
| 7,043,320 | B1 * | 5/2006 | Roumeliotis | G05B 13/0265 700/100 |
| 7,386,850 | B2 * | 6/2008 | Mullen | H04Q 3/64 379/265.01 |
| 7,818,082 | B2 * | 10/2010 | Roumeliotis | G05B 13/0265 700/100 |
| 8,000,946 | B2 * | 8/2011 | Haas | G06F 17/5009 700/100 |
| 8,015,043 | B2 * | 9/2011 | Cao | G06Q 10/00 705/7.12 |
| 8,214,240 | B1 | 7/2012 | Morris et al. | |
| 8,219,430 | B1 | 7/2012 | Thompson et al. | |
| 8,306,841 | B2 * | 11/2012 | Clarke | G06Q 10/063118 705/7.23 |
| 8,321,257 | B2 * | 11/2012 | Motoyama | G06Q 10/06312 705/7.13 |
| 8,370,192 | B2 * | 2/2013 | Deo | G06Q 10/06 705/7.36 |
| 8,515,793 | B2 * | 8/2013 | Chen | G06Q 10/04 705/7.11 |
| 8,539,437 | B2 * | 9/2013 | Finlayson | G06F 21/6218 717/101 |
| 8,543,438 | B1 * | 9/2013 | Fleiss | G06Q 10/0631 705/7.11 |
| 8,571,906 | B2 * | 10/2013 | Upadhyaya | G06Q 10/06 705/7.11 |
| 8,621,477 | B2 * | 12/2013 | Ferdous | G06F 11/3442 718/104 |
| 8,666,794 | B1 * | 3/2014 | Alletto-Walton | G06Q 10/06 705/7.16 |
| 8,813,086 | B2 * | 8/2014 | Bagheri | G06Q 10/06 718/102 |
| 9,141,581 | B2 * | 9/2015 | Sun | G06F 17/00 |
| 9,230,226 | B2 * | 1/2016 | Li | G06Q 10/0631 |
| 2002/0078432 | A1 * | 6/2002 | Charisius | G06Q 10/06 717/102 |
| 2003/0018762 | A1 * | 1/2003 | Mullen | H04Q 3/64 709/223 |
| 2003/0033184 | A1 * | 2/2003 | Benbassat | G06Q 10/06 705/7.14 |
| 2003/0185378 | A1 * | 10/2003 | Mullen | G06Q 10/06311 379/265.01 |
| 2003/0191795 | A1 * | 10/2003 | Bernardin | G06F 9/505 718/105 |
| 2005/0080658 | A1 * | 4/2005 | Kohn | G06Q 10/04 705/7.14 |
| 2005/0273341 | A1 * | 12/2005 | Hoffesommer | G06Q 10/04 705/35 |
| 2006/0004618 | A1 * | 1/2006 | Brixius | G06Q 10/06 705/7.18 |
| 2006/0047815 | A1 * | 3/2006 | Hamadi | G06F 9/5011 709/226 |
| 2006/0053043 | A1 * | 3/2006 | Clarke | G06Q 10/063118 705/7.17 |
| 2006/0160059 | A1 * | 7/2006 | Dompier | G06Q 10/10 434/362 |
| 2006/0229921 | A1 * | 10/2006 | Colbeck | G06Q 10/06 705/7.22 |
| 2007/0067196 | A1 * | 3/2007 | Usui | G06Q 10/06 705/7.12 |
| 2007/0100861 | A1 * | 5/2007 | Novy | G06F 17/21 |
| 2007/0150327 | A1 * | 6/2007 | Dromgold | G06F 17/30551 705/7.17 |
| 2007/0156731 | A1 * | 7/2007 | Ben-Zeev | G06Q 10/06 |
| 2007/0260502 | A1 * | 11/2007 | Motwani | G06Q 10/063112 705/7.14 |
| 2008/0066072 | A1 | 3/2008 | Yurekli et al. | |
| 2008/0126067 | A1 * | 5/2008 | Haas | G06F 17/5009 703/17 |
| 2008/0208660 | A1 * | 8/2008 | Kano | G06Q 10/04 705/7.37 |
| 2009/0064322 | A1 * | 3/2009 | Finlayson | G06F 21/6218 726/21 |
| 2009/0276281 | A1 * | 11/2009 | Foltz | G06Q 10/06 705/7.14 |
| 2010/0076803 | A1 * | 3/2010 | Deo | G06Q 10/06 705/7.13 |
| 2010/0274620 | A1 * | 10/2010 | Upadhyaya | G06Q 10/06 705/7.15 |
| 2011/0040596 | A1 * | 2/2011 | Chen | G06Q 10/04 705/7.38 |
| 2011/0321051 | A1 * | 12/2011 | Rastogi | G06F 9/4881 718/102 |
| 2012/0029963 | A1 | 2/2012 | Olding et al. | |
| 2013/0339970 | A1 * | 12/2013 | Bagheri | G06Q 10/06 718/103 |
| 2014/0019186 | A1 * | 1/2014 | Li | G06Q 10/0631 705/7.22 |
| 2014/0032255 | A1 * | 1/2014 | Hegazi | G06Q 10/04 705/7.22 |
| 2014/0142998 | A1 * | 5/2014 | Kroeger | G06Q 10/06311 705/7.13 |
| 2014/0215080 | A1 * | 7/2014 | Alabiso | H04L 47/70 709/226 |
| 2014/0278703 | A1 * | 9/2014 | Owens, Jr. | G06Q 10/06313 705/7.23 |
| 2014/0324494 | A1 * | 10/2014 | Agarwal | G06Q 10/06312 705/7.13 |
| 2015/0012324 | A1 * | 1/2015 | Lance | G06Q 10/06313 705/7.23 |

OTHER PUBLICATIONS

Wikipedia, "Project+/Executing," http://en.wikibooks.org/wiki/Project%2B/Executing, Feb. 1, 2013, 9 pages.

Extended European Search Report corresponding to EP Application No. 16150850.2, dated May 2, 2016, 5 pages.

* cited by examiner

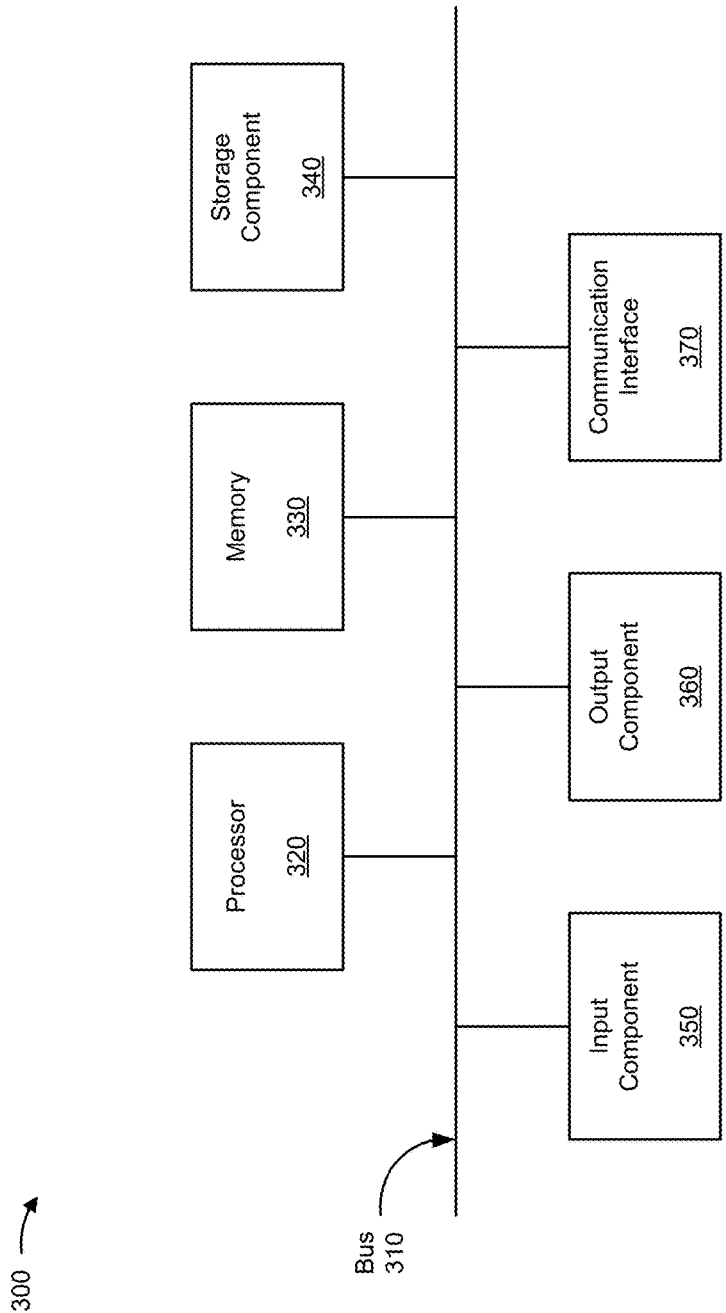

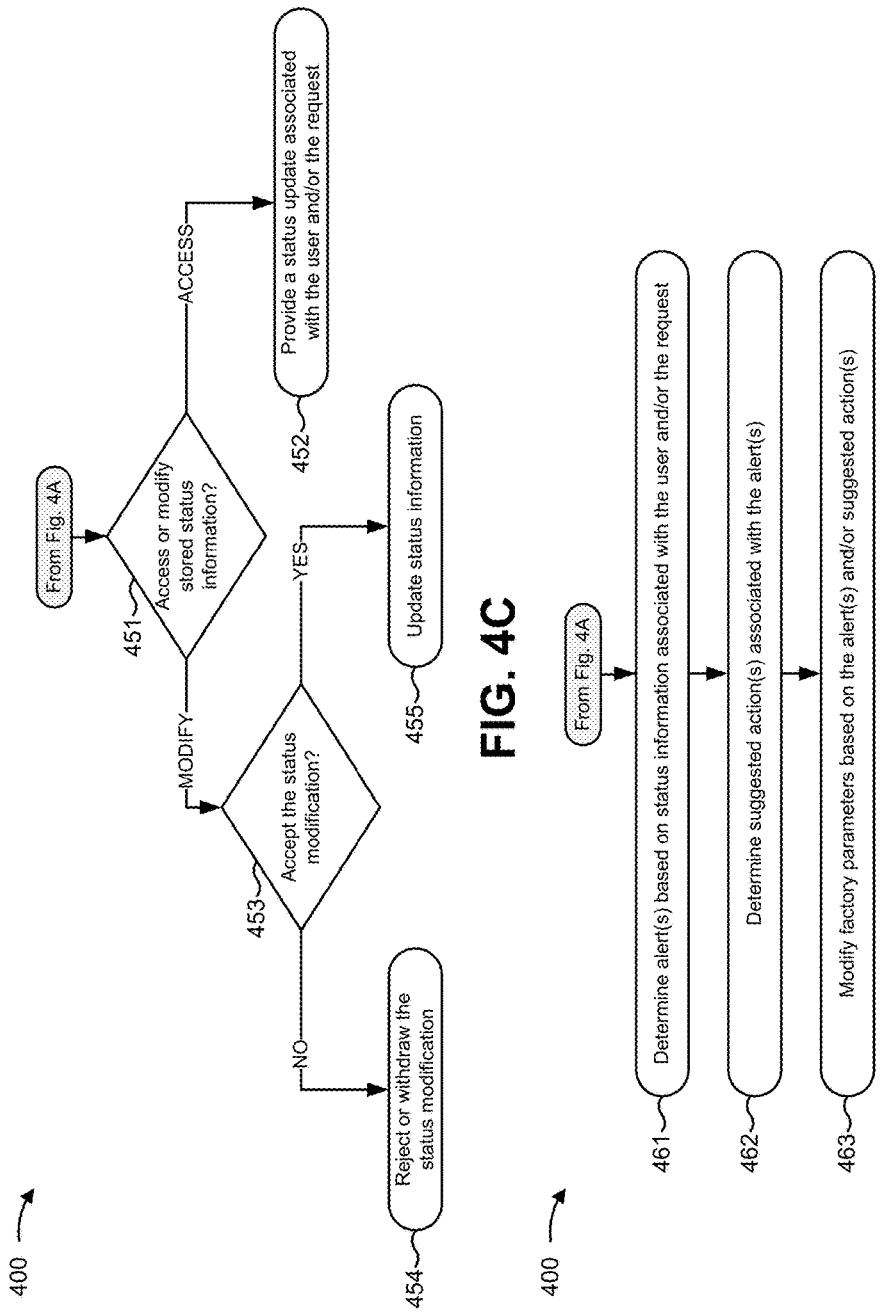

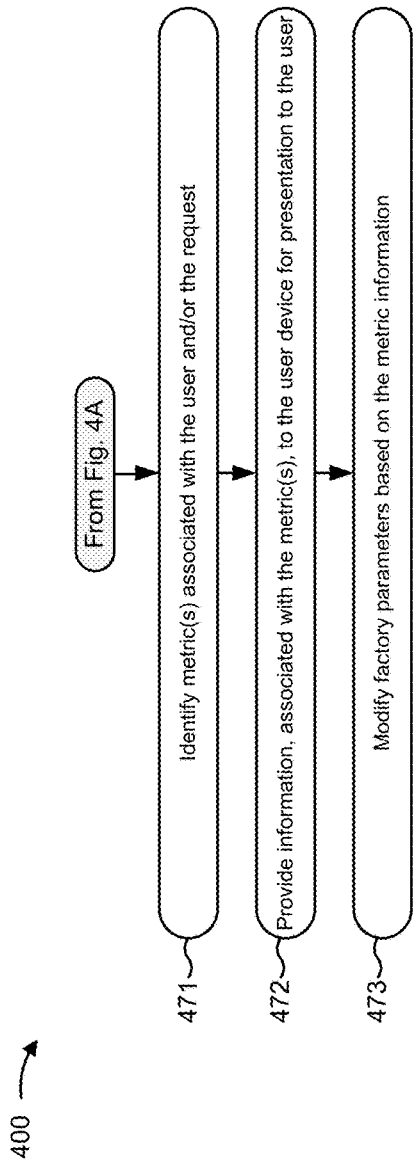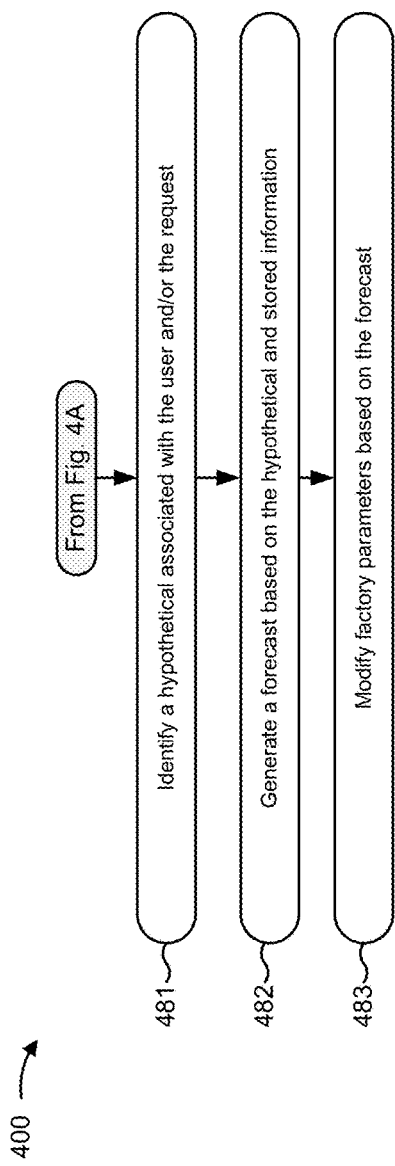

FACTORY MANAGEMENT SYSTEM

BACKGROUND

A factory may streamline product development by dividing labor among resources with specialized skillsets to deliver components assembled with reusable parts using a standardized process. For example, a software factory may fulfill software component orders by tasking software factory labor resources with developing new software elements and combining the new software elements with existing software elements to provide clients with made-to-order software components.

SUMMARY

According to some possible implementations, a device may receive information associated with a work request. The device may identify a work profile associated with generating a plan for a group of tasks to be performed in fulfilling the work request. The device may identify a group of task profiles associated with the group of tasks. The group of task profiles may identify a group of resources associated with performing the group of tasks, and parameters associated with estimating a resource demand for performing the group of tasks by the group of resources. The device may generate a plan, associated with the work request, based on the work profile and the group of task profiles. The plan may identify the group of tasks, an order for performing the group of tasks, and an estimated resource demand associated with performing the tasks. The device may provide, to a resource device associated with the group of resources, an assignment identifying a task from the group of tasks. The device may receive, from the resource device, a completion update identifying the task and a completion status associated with the task. The device may update status information based on the completion update and output a status update based on the status information.

According to some possible implementations, a computer-readable medium may store one or more instructions that, when executed by a processor of a device, cause the processor to obtain work information associated with a work request. The instructions may cause the processor to generate a plan to satisfy the work request. The plan may identify a group of tasks to satisfy the work request, a resource to complete the group of tasks, and a proposed demand associated with the resource completing the group of tasks. The group of tasks may be identified and organized according to work profile information associated with the work request. The resource may be identified according to task profile information associated with the group of tasks. The proposed demand may be determined based on a set of demand parameters associated with the work profile information and the task profile information. The instructions may cause the processor to determine a demand, associated with completing another group of tasks by the resource, based on the set of demand parameters. The other group of tasks may be identified in a schedule and may be associated with the work profile information and the task profile information. The instructions may cause the processor to determine a capacity, associated with completing tasks by the resource, based on a set of capacity parameters associated with resource profile information associated with the resource. The instructions may cause the processor to determine, based on the capacity and the demand, a supply associated with the resource. The instructions may cause the processor to provide, for presentation to a user, planning information associated with the plan, the schedule, the capacity, the supply, the demand, and the proposed demand.

According to some possible implementations, a method may include receiving, via a user interface, input information associated with a work request. The method may include determining a resource associated with the work request. The method may include determining a demand on the resource to perform the work request. The method may include determining other demands on the resource to perform planned work requests. The method may include determining an allocation of the resource to perform a group of tasks, associated with scheduled work requests, assigned to the resource. The method may include determining a status associated with the scheduled work requests. The method may include determining one or more metrics for measuring a progress or performance associated with the resource. The method may include providing, for presentation via the user interface, output information associated with the demand, the other demands, the allocation, the one or more metrics, and the status.

BRIEF DESCRIPTION OF THE DRAWINGS

FIG. 3 is a diagram of example components of one or more devices of FIG. 2;

FIGS. 4A-4F are flow charts of an example process for implementing a factory management system.

DETAILED DESCRIPTION

The following detailed description of example implementations refers to the accompanying drawings. The same reference numbers in different drawings may identify the same or similar elements.

A project manager may oversee a variety of projects for multiple clients. Each project may have unique contractual obligations for providing components associated with that project. The project manager may, thus, have difficulty raising and managing component demands on a factory to provide the components. Likewise, a factory lead may oversee factory resources to provide components for multiple projects and clients. The factory lead may, thus, have difficulty determining an optimal resource capacity and resource allocation to meet current or expected component demands.

A central factory management system may maintain stored information associated with clients, projects, components, tasks associated with the components, and resources associated with performing the tasks. The factory management system may, using the stored information, automate and/or assist the project manager and/or the factory with factory operation, including: creating and managing of work requests; determining optimal resource capacity; planning work requests; allocating factory resources; and scheduling task execution. The factory management system may generate, based on the stored information, planning information which includes real-time status updates, progress/performance metrics, alerts, and suggested actions.

The factory management system may provide relevant portions of the planning information to various stakeholders, such as the project manager, the factory lead, and clients. The factory management system may forecast a delivery schedule and/or a resource capacity, associated with the factory, in response to a hypothetical set of factory demands provided by the project manager and/or factory lead. The project manager may, thus, create and manage work requests with greater efficiency and less effort. The factory lead may plan factory capacity and resource allocation with greater efficiency and less effort. Clients, and service resources who may assist clients with generating work requests, may track the status, progress, and performance of projects. In this way, the factory management system may maximize value for the factory while providing greater transparency to clients, particularly when implemented for operating a software factory.

Figure 1:
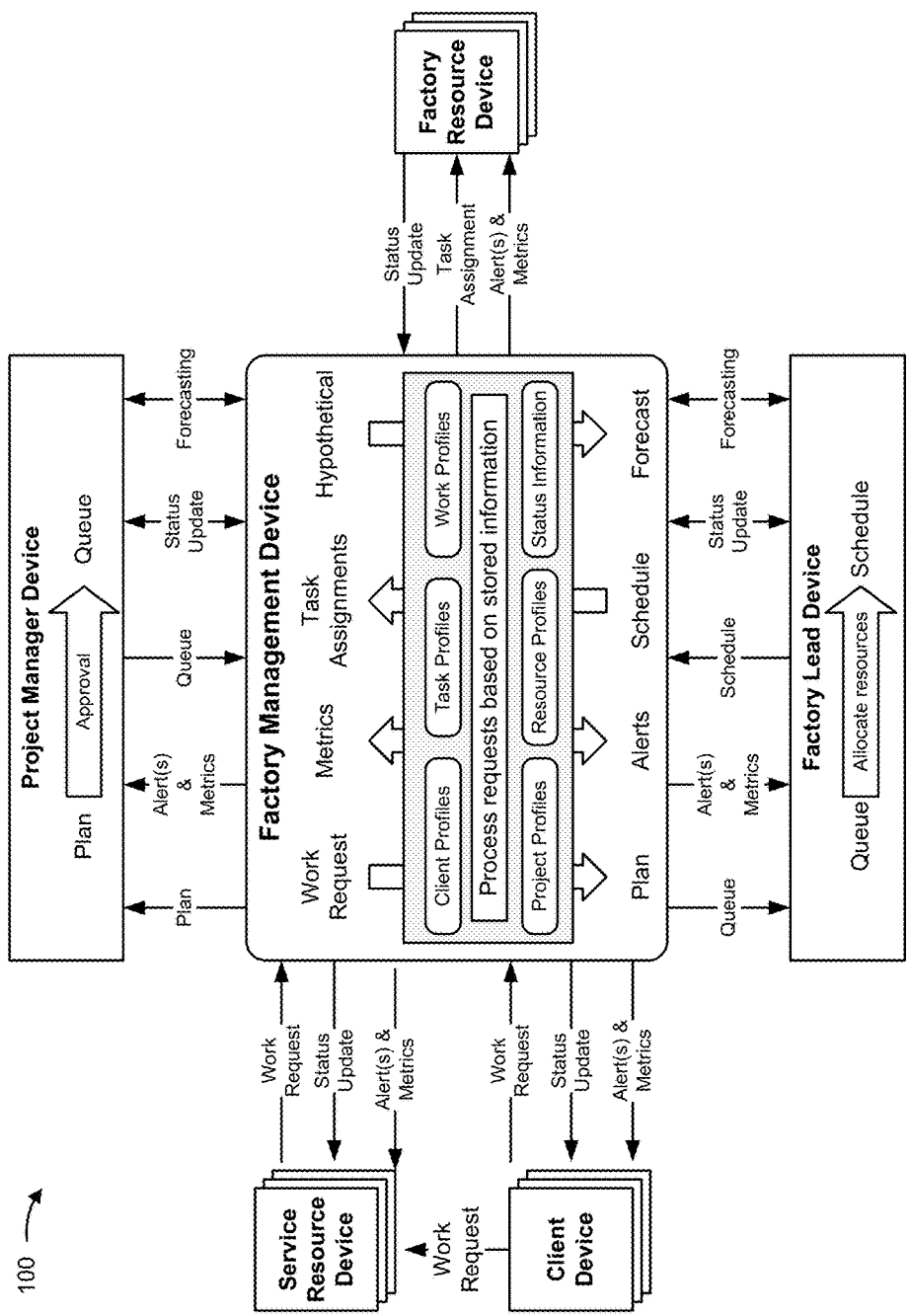
FIG. 1 is a diagram of an overview of an example implementation described herein.

FIG. 1 is a diagram of an overview of an example implementation 100 described herein. Assume, for FIG. 1, that a factory management system includes a factory management device which maintains stored information, including: client profiles, task profiles, work profiles, project profiles, resource profiles, and a factory schedule. The factory management device receives work requests from client devices and/or service resource devices, associated with clients and/or a service resources, respectively. The factory management device generates, based on the stored information, plans identifying resource demands to fulfill the work requests.

The factory management device adds new plans to a project queue for review by a project manager. When a project manager device, associated with the project manager, approves plans in the project queue, the factory management device moves the approved plans from the project queue to a factory queue for review by a factory lead. When a factory lead device, associated with a factory lead, allocates factory resources to plans in the factory queue, the factory management device moves the allocated plans from the factory queue to a factory schedule. The factory management device provides, based on the stored information, task assignments to factory resource devices associated with the particular factory resources.

The factory management device receives status updates from the factory resource devices, the project manager device, and the factory lead device. Based on the status updates, the factory management updates a status associated with projects, work requests, and/or tasks. The factory management device updates one or more profiles based on the status updates received. Additionally, or alternatively, the factory management device provides, to the project manager, the factory lead, the service resources, the clients, and/or the factory resources, status updates, performance and/or progress metrics, alerts, and suggested actions to the corresponding project manager device, factory lead device, service resource devices, client devices, and/or the factory resource devices.

The factory management device receives, from the project manager and the factory lead, hypothetical factory demands associated with forecasting a delivery schedule and/or resource demand. The factory management device generates forecasts, based on the hypothetical factory demands and the stored information, and provides the forecasts to the project management device and the factory lead device.

In this way, the factory management device may automate and/or assist a project manager and a factory lead with creating work requests, establishing factory resource capacity, allocating factory resources, and delivering components while providing the project manager, factory lead, service resources, and clients with relevant real-time progress, performance, and status updates.

Figure 2:
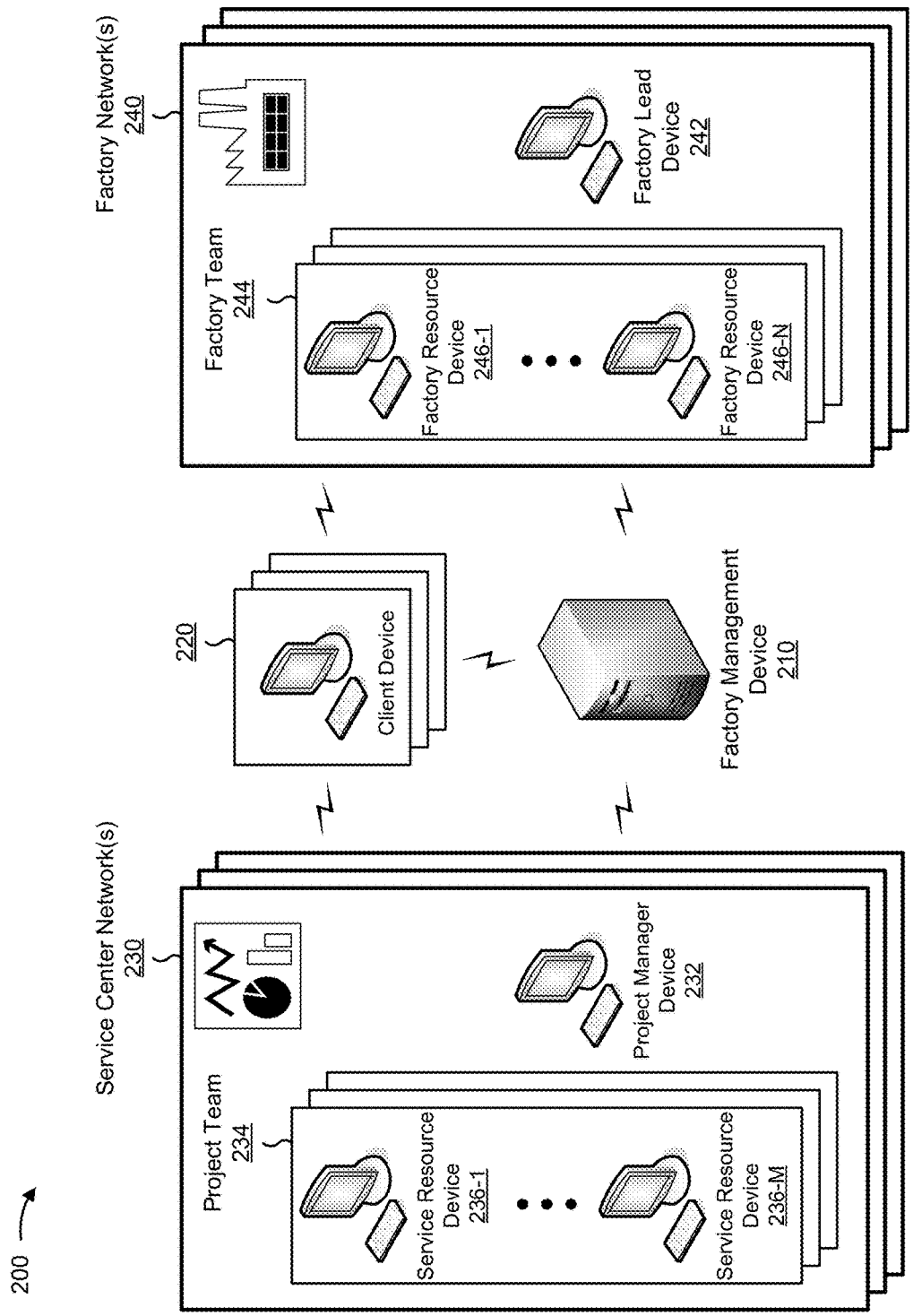
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a factory management device 210; one or more client devices 220; one or more service center networks 230; and one or more factory networks 240. Devices of environment 200 may interconnect via wired connections, wireless connections, or a combination of wired and wireless connections.

Factory management device 210 may include one or more devices capable of storing, processing, and/or routing information associated with managing a factory. For example, factory management device 210 may include a communication and/or computing device, such as a mobile phone (e.g., a smart phone, a radiotelephone, etc.), a rack-mounted computer, a desktop computer, a laptop computer, a tablet computer, a handheld computer, a terminal, or a similar type of device. In some implementations, factory management device 210 may include a communication interface that allows factory management device 210 to receive information from and/or transmit information to other devices in environment 200. For example, factory management device 210 may send, receive, store, process, and/or route information to, from, associated with, and/or between service center network(s) 230 and factory network(s) 240. Factory management device 210 may generate plans, metrics, alerts, suggested actions, task assignments, and/or forecasts based on information associated with service center network 220, factory network 230, clients, projects, work requests, and/or tasks.

Client device 220 may include one or more devices capable of receiving, generating, storing, processing, and/or providing information associated with a project and/or a work request. For example, client device 220 may include a communication and/or computing device, such as a mobile phone (e.g., a smart phone, a radiotelephone, etc.), a desktop computer, a laptop computer, a tablet computer, a handheld computer, a terminal, or a similar type of device. In some implementations, client device 210 may receive information from and/or transmit information to another device in environment 200. For example, client device 220 may transmit information associated with a work request to factory management device 210, project manager device 232, and/or service resource device 236 and may receive, from factory management device 210, status updates, alerts, suggested actions, and/or metrics associated with the work request.

Service center network 230 may include one or more wired and/or wireless networks. Service center network 230 may include a project manager device 232 and one or more project teams 234 of service resource devices 236-1, . . . , 236-M (M≥1; referred to collectively as "service resource devices 236" and individually as "service resource device 236") to factory management device 210 and/or to each other.

Project manager device 232 may include one or more devices capable of receiving, generating, storing, processing, and/or providing information associated with a project and/or a work request. For example, project manager device 232 may include a communication and/or computing device, such as a mobile phone (e.g., a smart phone, a radiotelephone, etc.), a desktop computer, a laptop computer, a tablet computer, a handheld computer, a terminal, or a similar type of device. In some implementations, project manager device 232 may receive information from and/or transmit information to another device in environment 200. For example, project manager device 232 may transmit information associated with creating, approving, and/or updating a completion status of a work request and/or a plan associated with the work request, to factory management device 210 and may receive, from factory management device 210, status updates, alerts, suggested actions, and/or metrics associated with the work request. Alternatively, or additionally, project manager device 232 may send, to factory management device 210, information associated with a hypothetical work request and/or resource supply and may receive, from project management device 210, corresponding information associated with a delivery schedule and/or resource supply/demand report based on the hypothetical.

Service resource device 236 may include one or more devices capable of receiving, generating, storing, processing, and/or providing information associated with a project and/or a work request. For example, service resource device 236 may include a communication and/or computing device, such as a mobile phone (e.g., a smart phone, a radiotelephone, etc.), a desktop computer, a laptop computer, a tablet computer, a handheld computer, a terminal, or a similar type of device. In some implementations, service resource device 236 may receive information from and/or transmit information to another device in environment 200. For example, service resource device 236 may transmit and/or receive information associated with a work request from client device to and/or from factory management device 210, client device 220, and/or project manager device 232. Alternatively, or additionally, service resource device 236 may receive, from factory management device 210, status updates, alerts, suggested actions, and/or metrics associated with the work request.

Factory network 240 may include one or more wired and/or wireless networks. Factory network 240 may include a factory lead device 242 and one or more factory teams 244 of factory resource devices 246-1, . . . , 246-N (N≥1; referred to collectively as "factory resource devices 246" and individually as "factory resource device 246") to factory management device 210 and/or to each other.

Factory lead device 242 may include one or more devices capable of receiving, generating, storing, processing, and/or providing information associated with a project and/or a work request. For example, factory lead device 242 may include a communication and/or computing device, such as a mobile phone (e.g., a smart phone, a radiotelephone, etc.), a desktop computer, a laptop computer, a tablet computer, a handheld computer, a terminal, or a similar type of device. In some implementations, factory lead device 242 may receive information from and/or transmit information to another device in environment 200. For example, factory lead device 242 may transmit information, associated with planning, scheduling, and/or updating a completion status of a work request and/or a plan associated with the work request, to factory management device 210 and may receive, from factory management device 210, status updates, alerts, suggested actions, and/or metrics associated with the plan. Alternatively, or additionally, factory lead device 242 may send, to factory management device 210, information associated with a hypothetical work request and/or resource supply and may receive, from project management device 210, corresponding information associated with a delivery schedule and/or resource supply/demand report based on the hypothetical.

Factory resource device 246 may include one or more devices capable of receiving, generating, storing, processing, and/or providing information associated with a project and/or a work request. For example, factory resource device 246 may include a communication and/or computing device, such as a mobile phone (e.g., a smart phone, a radiotelephone, etc.), a desktop computer, a laptop computer, a tablet computer, a handheld computer, a terminal, or a similar type of device. In some implementations, factory resource device 246 may receive information from and/or transmit information to another device in environment 200. For example, factory resource device 246 may send and/or receive information associated with performing a task assignment to and/or from factory management device 210. Alternatively, or additionally, factory resource device 246 may receive, from factory management device 210, status updates, alerts, suggested actions, and/or metrics associated with the task assignment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Alternatively, or additionally, a set of devices (e.g., one or more devices) of environment 200 may perform one or more functions described as being performed by another set of devices of environment 200.

FIG. 3 is a diagram of example components of a device 300. Device 300 may correspond to factory management device 210, client device 220, project manager device 232, service resource device 236, factory lead device 242, and/or factory resource device 246. In some implementations, factory management device 210, client device 220, project manager device 232, service resource device 236, factory lead device 242, and/or factory resource device 246 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Alternatively, or additionally, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Alternatively, or additionally, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Alternatively, or additionally, a set of components (e.g., one or more components) of device 300 may perform one or more functions described as being performed by another set of components of device 300.

FIGS. 4A-4F are flow charts of an example process 400 for implementing a factory management system. In some implementations, one or more process blocks of FIGS. 4A-4F may be performed by factory management device 210. In some implementations, one or more process blocks of FIGS. 4A-4F may be performed by another device or a group of devices separate from or including factory management device 210, such as client device 220, project manager device 232, service resource device 236, factory lead device 242, and/or factory resource device 246.

Figure 4A:
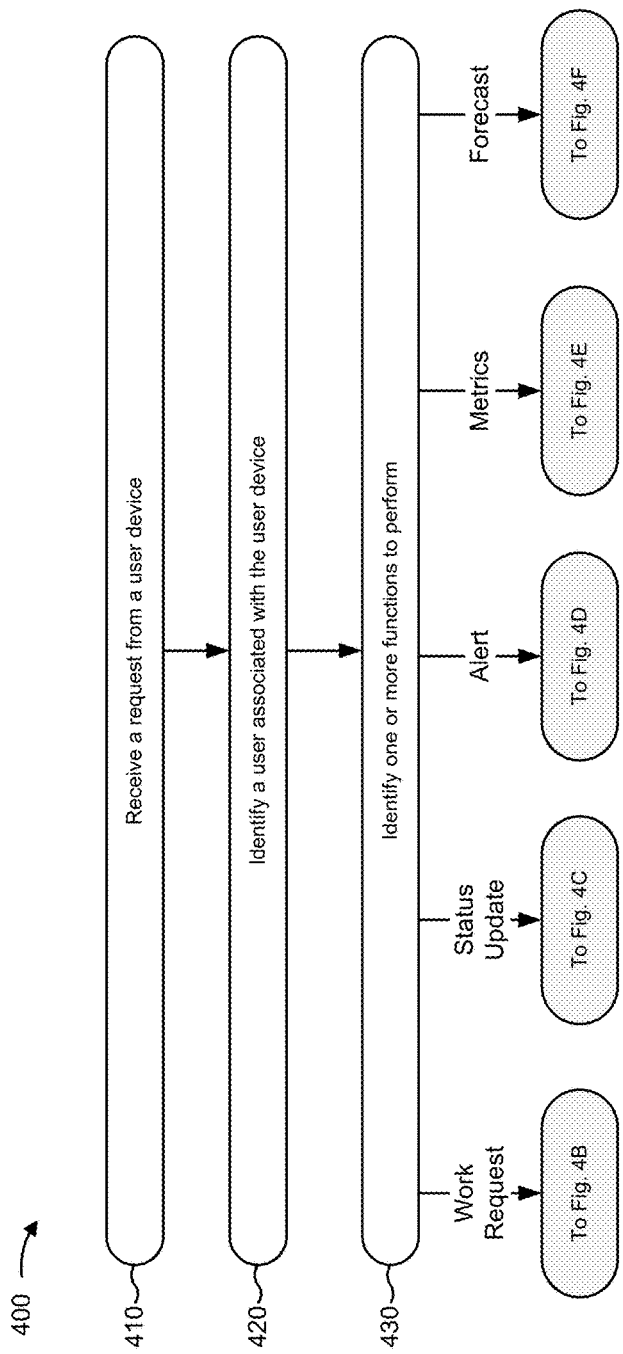

As shown in FIG. 4A, process 400 may include receiving a request from a user device (block 410). For example, a factory management device 210 may receive a request from a user device. The user device may include, e.g., a client device 220, a project manager device 232, a service resource device 236, a factory lead device 242, or a factory resource device 246. The request may be associated with user input provided by a user associated with the user device (e.g., via a factory management interface, such as a website, a portal, and/or another user interface).

As further shown in FIG. 4A, process 400 may include identifying a user associated with the user device (block 420). For example, factory management device 210 may identify a user associated with the user device. The user may include, e.g., a client, a project manager, a service resource, a factory lead, or a factor resource, associated with the corresponding client device 220, project manager device 232, service resource device 236, factory lead device 242, or factory resource device 246. In some implementations, factory management device 210 may identify the user based on information associated with the user device (e.g., a device identifier, a location identifier, or the like). Alternatively, or additionally, factory management device 210 may identify the user based on information included in and/or associated with the request (e.g., a user identifier, authentication information, login information, or the like).

As further shown in FIG. 4A, process 400 may include identifying one or more functions to perform (block 430). For example, factory management device 210 may identify one or more functions to perform based on information associated with and/or included in the request (e.g., based on user input to a user interface). In some implementations, factory management device 210 may identify one or more functions based on an identity associated with the user and/or the user device (e.g., based on a role associated with the user and/or device). Alternatively, or additionally, factory management device 210 may perform certain functions continuously, periodically, occasionally, and/or based on the satisfaction of a threshold (e.g., based on a set of conditions associated with a factory status or a user).

Functions may be associated with automating and/or assisting users with one or more factory operations. For example, functions may include sending, receiving, and/or generating information associated with a work request, a status update, an alert, one or more metrics, and/or a forecast.

A work request may include information associated with developing and/or delivering a component for a client (e.g., a program, report, or other product) for a client. For example, a client may contract for a particular engagement with a factory (e.g., for a particular time, cost, and/or quantity of full-time equivalent resources ("FTE")). During the course of an engagement, the factory may divide projects into groups of works requests and may divide the work requests into groups of tasks. Thus, performing a work request function may include, e.g., accessing, creating, modifying, approving, rejecting, withdrawing, planning, scheduling, allocating and/or assigning tasks associated with work requests.

Alternatively, or additionally, a work request function may include creating and/or modifying one or more profiles associated with tasks. For example, a client profile may include information about the client and/or engagement, such as client-specific resource and/or schedule requirements and/or guidelines.

Alternatively, or additionally, a project profile may include information about the project, such as project-specific resource and/or schedule requirements and/or guidelines.

Alternatively, or additionally, a task profile may include information associated with a task, such as parameters for planning, scheduling, allocating, and/or assigning a task associated with the task profile. For example, a task profile may identify a factory resource and/or factory resource team associated with skills required to perform a task and parameters for estimating a demand associated performing the task.

Alternatively, or additionally, a work profile may include information associated with planning, scheduling, allocating, and/or assigning tasks associated with the work profile.

Alternatively, or additionally, a resource profile may identify information associated with a factory's resources, such as parameters for estimating an availability and/or capacity of the factory resources to perform tasks associated with the task profiles.

Figure 4B:
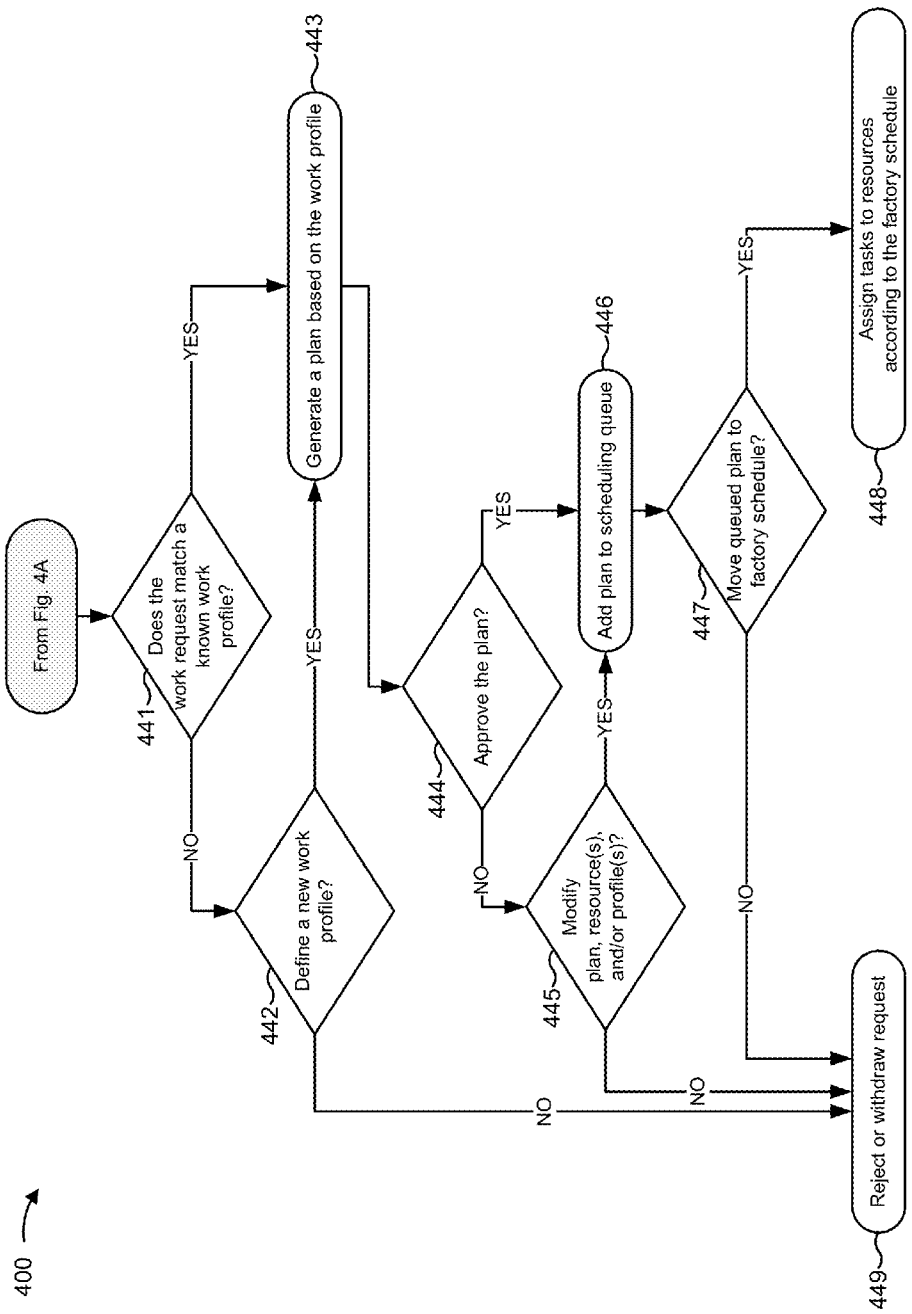

As shown in FIG. 4B, process 400 may include determining whether the work request matches a known work profile (block 441) based on determining that the request is associated with a work request (block 430="WORK REQUEST"). For example, factory management device 210 may determine whether a work request (e.g., associated with the request) identifies a known work profile. In some implementations, a user, associated with creating and/or modifying the work request, may identify (e.g., based on user input) a work profile associated with the work request. Alternatively, or additionally, factory management device 210 may generate one or more scores, representing an association level between the work request and known work profiles and/or other work requests, and may determine whether the work request matches a known work profile based on determining whether the score satisfies a threshold. In this way, factory management device 210 may identify information associated with planning the work request by determining whether the work request matches a known work profile.

As further shown in FIG. 4B, process 400 may include defining a new work profile (block 442) if the work request does not match a known work profile (block 441=NO). For example, factory management device 210 may define a new work profile based on information associated with the work request, other work requests, known work profiles, and/or other stored information. Alternatively, or additionally, factory management device 210 may define the new work profile based on information received from another device of environment 200 (e.g., based on user input via a user interface). The work profile may include a work breakdown structure which identifies tasks associated with fulfilling the work request, a hierarchy associated with structuring the tasks, and/or a relative order associated with performing the tasks. In this way, factory management device 210 may define a new type of work request by defining a new work profile when the work request does not match a known work profile.

As further shown in FIG. 4B, process 400 may include generating a plan based on the work profile (block 443) if the work request matches a known work profile (block 441=YES) or a new work profile is defined (block 442=YES). For example, factory management device 210 may identify tasks and/or demands associated with the work request. Factory management device 210 may identify, from the work profile, a hierarchical and/or chronological structure of tasks associated with the work request (e.g., represented as a list, tree, a work breakdown structure, or the like). Additionally, or alternatively, factory management device 210 may identify, based on the work profile and/or from task profiles associated with the tasks, parameters associated with estimating a demand, duration, or the like associated with performing the tasks and/or work request (e.g., parameters reflecting a complexity, user input, feedback, or the like). Additionally, or alternatively, factory management device 210 may identify, based on the work profile and/or from task profiles associated with the tasks, one or more factory resources, factory resource teams, and/or factory resource skills associated with performing tasks of the work request.

Alternatively, or additionally, factory management device 210 may generate the plan based on other stored information. For example, factory management device 210 may identify, from a client profile associated with the work request, contractual commitments associated with planning the work request (e.g., a resource allocation, delivery schedule, and/or cost associated with an engagement). Alternatively, or additionally, factory management device 210 may identify, based on one or more resource profiles, parameters for estimating a resource availability and/or capacity associated with factory resources (e.g., parameters reflecting a skill level and/or feedback). Alternatively, or additionally, factory management device 210 may generate the plan based on information received from another device of environment 200. For example, factory management device 210 may receive information (e.g., user input from the factory lead and/or the project manager), associated with creating a new task and/or work request, via a user interface associated with the user device (e.g., factory lead device 242 and/or project manager device 232). Alternatively, or additionally, factory management device 210 may receive feedback, associated with actual values of resource demands associated with completed work requests and/or tasks, from which factory management device 210 may adjust parameters for determining estimated values of resource demands. In this way, factory management device 210 may automate and/or simplify accurate planning of new work requests using stored information associated with other work requests.

As further shown in FIG. 4B, process 400 may include approving the plan (block 444). For example, factory management device 210 may approve the plan by determining whether a resource supply satisfies an estimated resource demand associated with the plan. In some implementations, factory management device 210 may determine a score associated with the plan and may approve the plan based on determining whether the score satisfies a threshold. Factory management device 210 may determine the score and/or the threshold based on a client profile, a work profile, a project profile, a group of task profiles, and/or a group of resource profiles associated with the plan. For example, the score and/or threshold may be associated with one or more values, confidence levels, or the like associated with the resource supply, the estimated resource demand, an estimated plan duration, a contractual obligation, or the like. Alternatively, or additionally, factory management device 210 may approve the plan based on information (e.g., based on user input) received from another device (e.g., project manager device 232 and/or factory lead device 242). In this way, factory management device 210 may identify a plan as being approved.

As further shown in FIG. 4B, process 400 may include modifying the plan, resource(s), factory schedule, and/or profile(s) (block 445) if the plan is not approved (block 444=NO). For example, factory management device 210 may identify a reason for not approving the plan and may modify the plan, one or more resources, a factory schedule, and/or one or more profiles in order to approve the plan. In some implementations, factory management device 210 may modify a client profile and/or a project profile (e.g., to adjust an approved resource supply and/or duration, associated with the client/and or project, to satisfy an estimated resource demand and/or duration, associated with the plan). In some implementations, factory management device 210 may modify a work profile associated with the plan (e.g., to add, remove, and/or modify one or more tasks and/or to modify parameters associated with estimating the resource demand and/or duration). In some implementations, factory management device 210 may modify one or more task profiles (e.g., to modify to parameters associated with estimating the resource demand and/or duration). In some implementations, factory management device 210 may modify one or more factory resource profiles (e.g., to modify a resource allocation and/or resource supply to satisfy the estimated resource demand).

Alternatively, or additionally, factory management device 210 may modify one or more task profiles, work profiles, and/or resource profiles based on status information associated with completed and/or in-progress tasks and/or work requests. For example, factory management device 210 may update parameters associated with generating estimates, for a duration and/or a resource demand associated with a particular task, based on corresponding observed values of duration and/or resource demand for the particular task.

Alternatively, or additionally, factory management device 210 may modify the factory schedule. For example, factory management device 210 may add, remove, and/or modify one or more scheduled work requests and/or tasks to adjust an allocation of resources associated with approving the plan. In some implementations, factory device 210 may generate one or more scores associated with tasks associated with the plan and/or scheduled tasks associated with the plan and may modify the schedule and/or plan based on the one or more scores. The score(s) may be based on, e.g., one or more profiles and may be associated with, e.g., one or more dates, priorities, clients, contractual commitments, metrics, or the like.

Alternatively, or additionally, factory management device 210 may modify the plan, resource(s), factory schedule, and/or profile(s) based on information (e.g., based on user input) received from another device (e.g., project manager device 232 and/or factory lead device 242). In this way, factory management device 210 may modify a plan and/or stored information associated with the plan in order to approve the plan.

As further shown in FIG. 4B, process 400 may include adding the plan to a factory queue (block 446) if the plan is approved (block 444=YES) or if the plan, resource(s), and/or profile(s) are modified (block 445=YES). For example, factory management device 210 may add the plan to a factory queue. The factory queue may include a list of entries identifying approved, but unscheduled, plans.

As further shown in FIG. 4B, process 400 may include moving the plan from the factory queue to a factory schedule (block 447) if the plan is moved from the queue to the factory schedule (block 447=YES). For example, factory management device 210 may generate a score associated with plans identified in the factory queue. In some implementations, the score may be based on an age of an entry associated with the plan (e.g., a first-in, first-out operating scheme). Alternatively, or additionally, the score may be based on a priority and/or criticality level associated with the work request and/or plan. Alternatively, or additionally, the score may be based on a client profile (e.g., contractual obligations associated with resource allocation and/or delivery schedule). Alternatively, or additionally, the score may be based on resource allocation and/or availability of a factory and/or factory resource team (e.g., based tasks already in the factory schedule). Factory management device 210 may schedule a plan based on the determining that a score, associated with the plan, satisfies a particular threshold. For example, factory management device 210 may identify (e.g., from the plan and/or from task profiles) one or more factory resources and/or factory resource teams to perform the tasks. Factory management device 210 may identify scheduled start and/or finish times associated with the tasks and/or the work request (e.g., expressed as one or more dates and/or date ranges). Alternatively, or additionally, factory management device 210 may determine whether, when, and/or how to move a plan from the factory queue to the schedule based on information (e.g., based on user input) received from another device (e.g., factory lead device 242). In this way, factory management device 210 may integrate a work request into a factory schedule.

As further shown in FIG. 4B, process 400 may include assigning tasks to resources according to the factory schedule (block 448). For example, factory management device 210 may identify, from the factory schedule, factory resources allocated to perform tasks, and may provide, to factory resource devices 246 associated with the factory resources, assignments to perform the tasks. In this way, factory management device 210 may notify factory resources of tasks to be performed.

As further shown in FIG. 4B, process 400 may include rejecting or withdrawing the request (block 449) if a new work profile is not defined (block 442=NO); the plan, resource(s), and/or profile(s) are not modified (block 445=NO); or if the queued plan is not moved to the factory schedule (block 447=NO). For example, factory management device 210 may reject a work request by identifying the work request as rejected and/or by sending, to the user device and/or another device of environment 200, information associated with rejecting the work request. Factory management device 210 may withdraw a work request by removing the work request and/or by sending, to the user device and/or another device of environment 200, information associated with withdrawing the work request. In this way, factory management device 210 may reject or withdraw work requests which have not been planned or for which a plan has not been approved or scheduled.

As shown in FIG. 4C, process 400 may include determining whether the request is associated with accessing or modifying status information (block 451) based on determining that the request is associated with a status update (block 430="STATUS UPDATE"). For example, factory management device 210 may determine whether information included in and/or associated with the request is associated with updating and/or retrieving stored status information. A status update function may, thus, include, e.g., accessing, creating, modifying, approving, rejecting, and/or withdrawing information associated with the status information. In some implementations, a factory resource, associated with a factory resource device 246, may complete an assigned task and may provide status update information, associated with updating a completion status of the task, to factory management device 210. Alternatively, or additionally, another device (e.g., project manager device 232 and/or factory lead device 242) may provide status update information associated with updating, accepting, rejecting, and/or withdrawing a completion status associated with a task, work request, and/or project. Alternatively, or additionally, factory management device 210 may determine, based on a context of the request, that the request is associated with modifying status information (e.g., by identifying a request associated with the completion of a deliverable and/or intermediate component). Alternatively, or additionally, devices of environment 200 may request to access status information (e.g., a completion status associated with a task) stored by factory management device 210. In this way, factory management device 210 may receive and/or provide status information from/to devices of environment 200.

As further shown in FIG. 4C, process 400 may include providing a status update associated with the user and/or the request (block 452) based on determining that the request is associated with accessing status information (block 451=ACCESS). For example, factory management device 210 may provide, to the user device (e.g., another device of environment 200), a status update for presentation to a user of the user device.

The status update may include a particular subset of the status information. For example, a status update may represent a status associated with a task, a work request, a plan, a project, an engagement, or the like (e.g., new, accepted, rejected, withdrawn, planned, queued, scheduled, allocated, assigned, not started, in progress, on time, delayed, finished, or the like). Alternatively, or additionally, the status update may include information associated with a status of a factory resource, a factory resource team, a factory, a service resource, a service resource team, and/or a service center (e.g., indicating a capacity, a demand, an allocation, an availability, or the like). Alternatively, or additionally, the status update may be associated with a client, a factory lead, a project manager, or the like (e.g., indicating an acceptance, a rejection, a withdrawal, or the like).

In some implementations, factory management device 210 may provide status information for one or more work requests, projects, engagements, clients, factories, and/or service centers associated with the user. Alternatively, or additionally, factory management device 210 may provide the status information based on identifying status information for which the user has expressed a preference and/or is permitted to access (e.g., based on user input, information included in the request, a profile associated with the user, the status information, or the like). Alternatively, or additionally, factory management device 210 may rank status information available to the user and provide a particular subset of the status information whose ranking satisfies a threshold. The ranking may correspond, e.g., to an estimated level of importance and/or relevance to the user. In this way, factory management device 210 may provide relevant status information to a user.

As further shown in FIG. 4C, process 400 may include determining whether to accept the status modification (block 453) based on determining that the request is associated with modifying status information (block 451=MODIFY). For example, factory management device 210 may accept the status update based on determining whether the status modification correctly identifies a completion status. Alternatively, or additionally, factory management device 210 may generate a score representing a confidence level associated with the status modification and may accept the status modification based on determining that the score satisfies a threshold. Alternatively, or additionally, factory management device 210 may accept the status modification based on information (e.g., based on user input) received from another device (e.g., client device 202, project manager device 232, and/or factory lead device 242). In this way, factory management device 210 may determine whether to accept an update to stored status information.

As further shown in FIG. 4C, process 400 may include rejecting or withdrawing the status modification (block 454) based on determining not to accept the status modification (block 453=NO). For example, factory management device 210 may determine that the status modification is to be rejected or withdrawn. Factory management device 210 may reject a status modification by identifying the status modification as rejected and/or by sending, to the user device and/or another device of environment 200, information associated with rejecting the status modification. Factory management device 210 may withdraw a status modification by removing the status modification and/or by sending, to the user device and/or another device of environment 200, information associated with withdrawing the status modification. In this way, factory management device 210 may reject or withdraw status modifications which have not been accepted.

As further shown in FIG. 4C, process 400 may include updating the status information (block 455) based on determining to accept the status modification (block 453=YES). For example, factory management device 210 may modify previously stored status information based on the status modification. In this way, the status information stored by factory management device 210 may identify tasks, work requests, projects, or the like whose completion status has been accepted.

As shown in FIG. 4D, process 400 may include determining alert(s) based on status information associated with the user and/or the request (block 461) based on determining that the request is associated with an alert (block 430=ALERT). For example, factory management device 210 may identify, based on stored status information, one or more alerts associated with the user and/or the request. An alert may be associated with an actual or expected delivery schedule, resource allocation, performance metric, completion status, or the like. For example, an alert may identify a project, work, and/or task delay; an insufficient, excessive, and/or inefficient allocation of resources; a deficiency between actual performance and expected or contracted performance; a change in a particular subset of status information; or the like. In this way, factory management device 210 may identify actual and/or potential issues associated with the factory.

An alert may include information associated with a particular status update, or a portion thereof, determined to be associated with the user of the user device (e.g., by factory management device 210). Alternatively, or additionally, an alert may include one or more suggestion actions associated with the particular status update or the portion thereof (e.g., to address an issue identified by the alert). An alert function may, thus, include accessing, creating and/or modifying information associated with an alert and/or a suggested action.

As further shown in FIG. 4D, process 400 may include determining suggested action(s) associated with the alert(s) (block 462). For example, factory management device 210 may determine one or more actions for a user to perform to resolve issues identified by an alert. In some implementations, factory management device 210 may identify alternative actions to perform and may generate scores for the alternative actions based on, e.g., a likelihood that and/or extent to which performing the alternative actions will address the issue identified by the alert. Factory management device 210 may determine one or more suggested actions based on ranking the alternative actions by score and/or based on identifying one or more alternative actions whose score satisfies a threshold. In this way, factory management device 210 may identify actions for the user to perform to address issues associated with the factory.

As further shown in FIG. 4D, process 400 may include modifying factory parameters based on the alert(s) and/or the suggested action(s) (block 463). For example, factory management device 210 may modify factory parameters by implementing one or more of the suggested actions. Factory parameters may include, e.g., status information and/or one or more profiles. Alternatively, or additionally, factory management device 210 may send, to the user device, information, for presentation to the user, which identifies the alert(s) and/or suggested action(s). Factory management device 210 may modify factory parameters based on information received from the user device (e.g., user input associated with implementing one or more of the suggested actions and/or one or more other actions). In this way, factory management device 210 may modify factory parameters to address issues.

As shown in FIG. 4E, process 400 may include identifying metric(s) associated with the user and/or the request (block 471) based on determining that the request is associated with metrics (block 430=METRICS). For example, factory management device 210 may identify particular metrics associated with the user and/or the request (e.g., based on identifying a task, work request, project, resource team, factory, service center, client, or the like associated with the request). A metric may include a quantity, or a representation of a quantity, associated with measuring an allocation of time, money, and/or resources associated with one or more factories, factory resource teams, service centers, project teams, clients, engagements, projects, work requests, and/or tasks. Alternatively, or additionally, a metric may be associated with a quality and/or a delivery schedule. A metric function may, thus, include, e.g., presenting, creating, and/or modifying information associated with a metric.

The metrics may include, e.g., measurements of performance and/or progress of a task, work request, project, or the like (e.g., an earned value ("EV"), a planned value ("PV"), an actual cost ("AC"), a budget at completion ("BAC"), an estimate at completion ("EAC"), a cost performance index ("CPI"), a cost variance ("CV"), an estimate to complete ("ETC"), a schedule variance ("SV"), a schedule performance index ("SPI"), a to complete performance index ("TCPI"), an actual cost variance ("VAC"), a percent completion, or the like). Alternatively, or additionally, the metrics may include measurements of performance and/or allocation efficiency of a resource, a resource team, and/or a factory (e.g., based on a capacity, an availability, an allocation, a demand, and/or a demand-supply gap). Alternatively, or additionally, the metrics may include relationships between one or more metrics and one or more other metrics and/or another variable (e.g., a correlation between a metric and another metric, time, or another variable). In this way, factory management device 210 may identify metrics relevant to a user and/or a user's request.

As further shown in FIG. 4E, process 400 may include providing information, associated with the metric(s), to the user device for presentation to the user (block 472). For example, factory management device 210 may identify status information and/or one or more profiles, associated with determining value(s) for the metric(s), and may determine actual and/or estimated value(s) for the metric(s). Alternatively, or additionally, factory management device 210 may identify and/or generate representation(s) (e.g., images, colors, sounds, symbols, or the like), corresponding to the value(s). Factory management device 210 may send some or all of the value(s) and/or representation(s) to the user device for presentation to the user. In this way, factory management device 210 may apprise the user of factory performance and/or progress.

As further shown in FIG. 4E, process 400 may include modifying factory parameters based on the metric information (block 473). For example, factory management device 210 may modify one or more task, work, and/or resource profiles based on metric information associated with the task, work, and/or resource profiles. Factory management device 210 may modify one or more plans, schedules, and/or assignments associated with the updated profile(s). Alternatively, or additionally, factory management device 210 may update factory parameters based on information received from another device (e.g., user input based on metric information). In this way, factory management device 210 may correct factory parameters based on actual metrics.

As shown in FIG. 4F, process 400 may include identifying a hypothetical associated with the user and/or the request (block 481) based on determining that the request is associated with a forecast (block 430=FORECAST). For example, factory management device 210 may determine, based on the request and/or the user, factory operating parameters associated with a hypothetical. The parameters may be associated with creating, modifying, and/or approving one or more plans, task assignments, and/or delivery schedules. Alternatively, or additionally, the hypothetical may be associated with modifying a factory resource capacity and/or one or more profiles. In this way, factory management device 210 may identify a scenario to be forecast.

As further shown in FIG. 4F, process 400 may include generating a forecast based on the hypothetical and stored information (block 482). For example, factory management device 210 may identify stored information (e.g., status information and/or one or more profiles), associated with predicting a status and/or operation of the factory, and may generate a forecast based on the identified information and the hypothetical factory parameters. A forecast may include information associated with a predicted schedule, and/or a predicted resource supply and/or demand, determined based on a hypothetical work load and/or hypothetical resource supply and/or demand. A forecast function may, thus, include information associated with presenting, creating, and/or modifying a forecast and/or a hypothetical associated with generating a forecast.

The forecast may represent, e.g.: a predicted resource supply, demand, allocation, and/or availability; predicted start and/or finish times for tasks, work requests, and/or projects; or the like. Factory management device 210 may determine a score associated with a confidence level of the forecast and/or a range associated with predicted variables of the forecast.

As further shown in FIG. 4F, process 400 may include modifying factory parameters based on the forecast (block 483). For example, factory management device 210 may create and/or modify one or more plans, schedules, and/or assignments associated with the hypothetical and/or the forecast. Factory management device 210 may adjust a resource capacity based on the one or more plans, schedules, and/or assignments (e.g., by modifying one or more resource profiles). Alternatively, or additionally, factory management device 210 may provide information associated with the forecast to another device (e.g., project manager device 232 and/or factory lead device 242) and may update factory parameters based on information (e.g., based on user input) received from the other device. In this way, factory management device 210 may adjust factory parameters based on anticipated demands.

Although FIGS. 4A-4F show example blocks of process 400, in some implementations, process 400 may include additional blocks, fewer blocks, different blocks, or differently arranged blocks than those depicted in FIGS. 4A-4F. Alternatively, or additionally, two or more of the blocks of process 400 may be performed in parallel.

FIGS. 5A-5L are diagrams of an example implementation 500 relating to example process 400 shown in FIGS. 4A-4F. FIGS. 5A-5L show an example of implementing a factory management system.

Figure 5A:
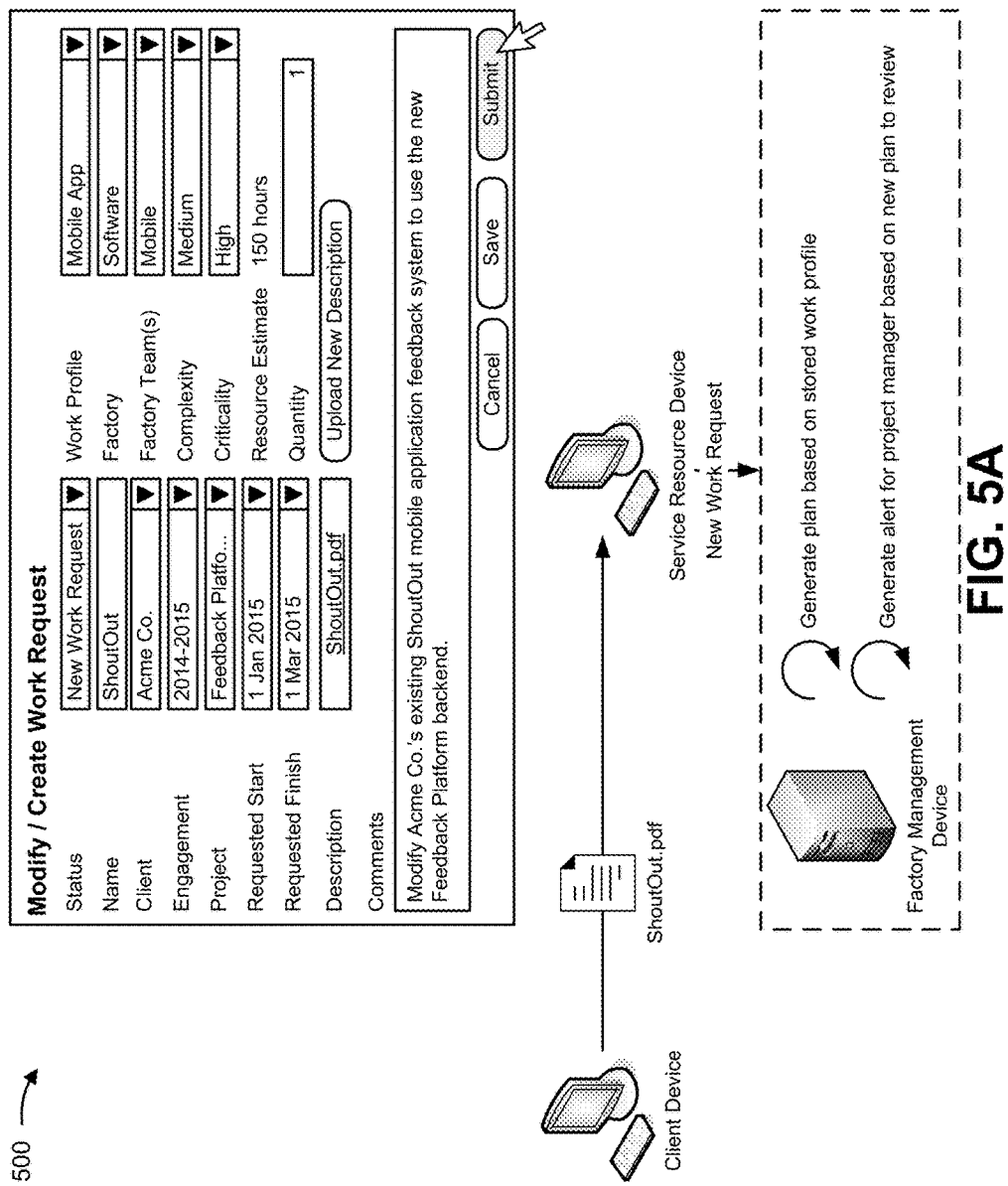
FIGS. 5A-5L are diagrams of an example implementation relating to the example process shown in FIG. 4.

As shown in FIG. 5A, assume, for example implementation 500, that a client sends, to a service resource device (e.g., service resource device 236) via a client device (e.g., client device 220), information associated with ordering a software component (e.g., "ShoutOut.pdf"). Assume further that the service resource device presents, for display to the service resource, a user interface associated with creating a new work request. Assume that, based on the information received from the client, the service resource identifies a status (e.g., "New Work Request") and a name (e.g., "Shout-Out") associated with a new work request and, by selecting from a list of options provided by a factory management device (e.g., factory management device 210) and presented via the user interface, further identifies: a client ("Acme Co."), an engagement (e.g., "2014-2015"), a project (e.g., "Feedback Platform"), a requested start (e.g., "1 Jan. 2015"), a requested finish (e.g., "1 Mar. 2015"), a work profile (e.g., "Mobile App"), a factory (e.g., "Software"), a factory team (e.g., "Mobile"), a complexity (e.g., "Medium"), a criticality (e.g., "High"), and a quantity (e.g., "1").

Assume that the client and/or service resource further provides, via the user interface, a description (e.g., contents of "ShoutOut.pdf") and comments (e.g., "Modify Acme Co.'s existing ShoutOut mobile application feedback system to use the new Feedback Platform backend"). Based on exchanged information, based on input from the service resource, between the service resource device and the factory management device, the user interface presents a resource estimate for the new work order (e.g., "150 hours"). Assume that the service resource submits the new work request to the factory management device (e.g., by selecting a "Submit" button). Based on receiving the new work request from the service resource device, the factory management device automatically generates a plan based on the work profile identified by the work request. Additionally, the factory management device generates an alert for a project manager to review the new plan.

Figure 5B:
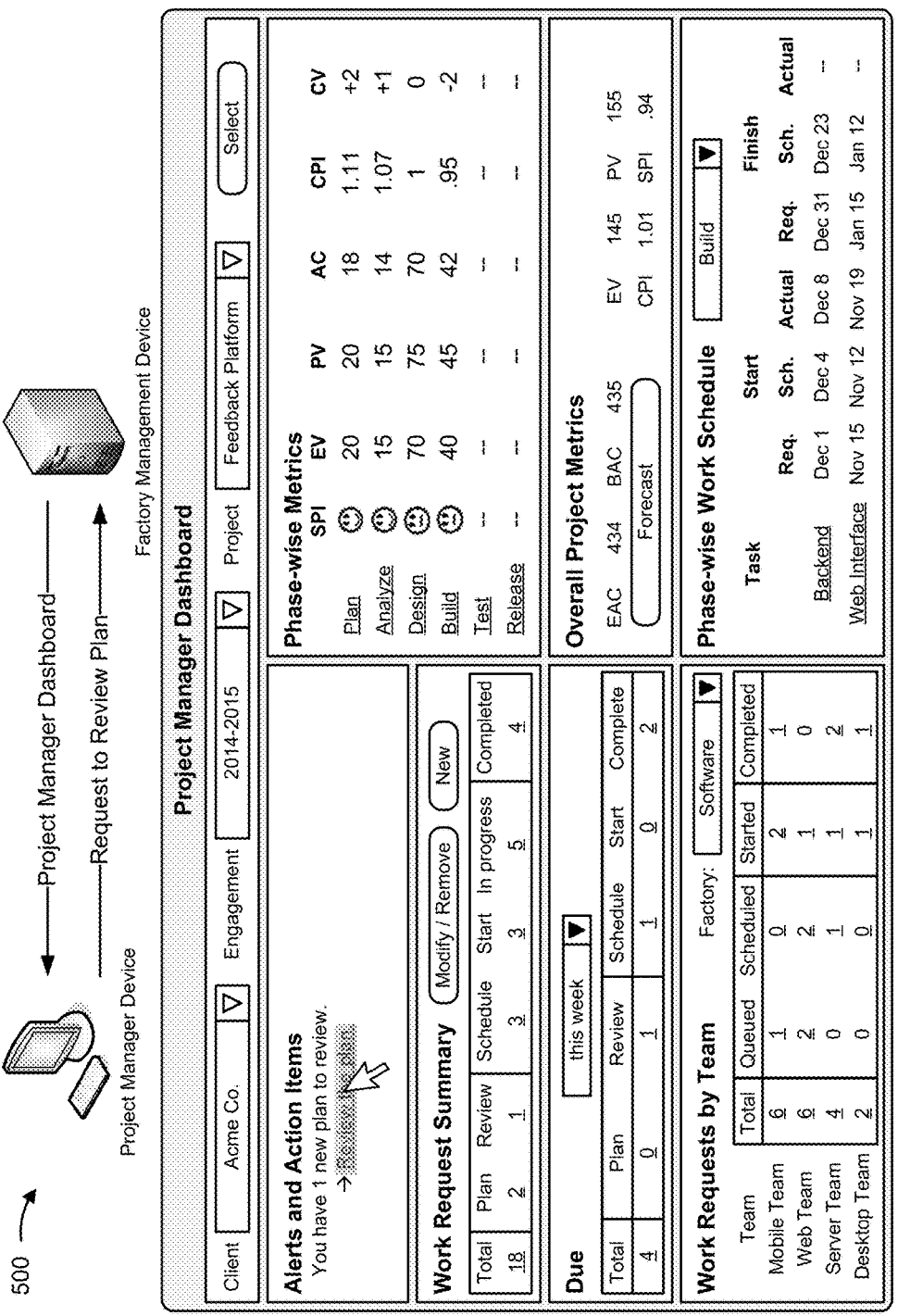

As shown in FIG. 5B, assume, for example implementation 500, that a project manager device (e.g., project manager device 232), requests, from the factory management device, information associated with presenting, to the project manager, a project manager dashboard. Assume further that the request identifies a client (e.g., "Acme Co."), an engagement (e.g., "2014-1015"), and a project (e.g., "Feedback Platform"). Based on the request, the factory management device provides, to the project manager device, status update information, metric information, schedule information, and alert information associated with the project manager and the identified project.

Assume that the status update information includes information for presenting, within the project manager dashboard, a "Work Request Summary" section, a "Due" section, and a "Work Requests by Team" section. The "Work Request Summary" section indicates a total quantity of work requests (e.g., 18) associated with the project, as well as a breakdown by status (e.g., "Plan," "Review," "Schedule," "Start," "In Progress," and "Completed"). The "Due" section indicates quantities of work requests, from the work request summary, for which a status change is due within a particular time period (e.g., "this week"). The "Work Requests by Team" section indicates quantities (e.g., total and by status) of work requests associated with factory resource team (e.g., "Mobile Team," "Web Team," "Server Team," and "Desktop Team") of a particular factory (e.g., "Software").

Assume that the metric information includes information for presenting, within the project manager dashboard, a "Phase-wise Metrics" section and an "Overall Project Metrics" section. The "Phase-wise Metrics" section indicates an SPI range (e.g., represented as happy, sad, and/or ambivalent expressions corresponding to particular SPI ranges) and numerical EV, PV, AC, CPI, and CV values associated with phases of the project (e.g., "Plan," "Analyze," "Design," "Build," "Test," "Release"). The "Overall Project Metrics" section indicates an EAC, BAC, EV, PV, CPI, and SPI associated with the overall project and provides the project manager with an option to forecast information.

Assume that the schedule information includes information for presenting, within the project manager dashboard, a "Phase-wise Work Schedule" section. The "Phase-wise Work Schedule" section identifies tasks, associated with a particular phase (e.g., the build phase) of the project, and requested, scheduled, and actual start and finish dates associated with the tasks of the particular phase.

Assume that the alert information includes information for presenting, within the project manager dashboard, an "Alert" section. The "Alert" section indicates an alert (e.g., "You have 1 new plan to review.") and a corresponding suggested action (e.g., "Review the plan.").

Assume further that particular portions of information (e.g., buttons and underlined text) presented within the project manager dashboard may be selected (e.g., based on user input) to send, from the project manager device to the factory management device, a request for additional information associated with the particular selected portion. Assume further that the project manager selects the suggested action identified within the "Alert" section, and the project manager device provides a corresponding request (e.g., "Request to Review Plan") to the factory management device.

Figure 5C:
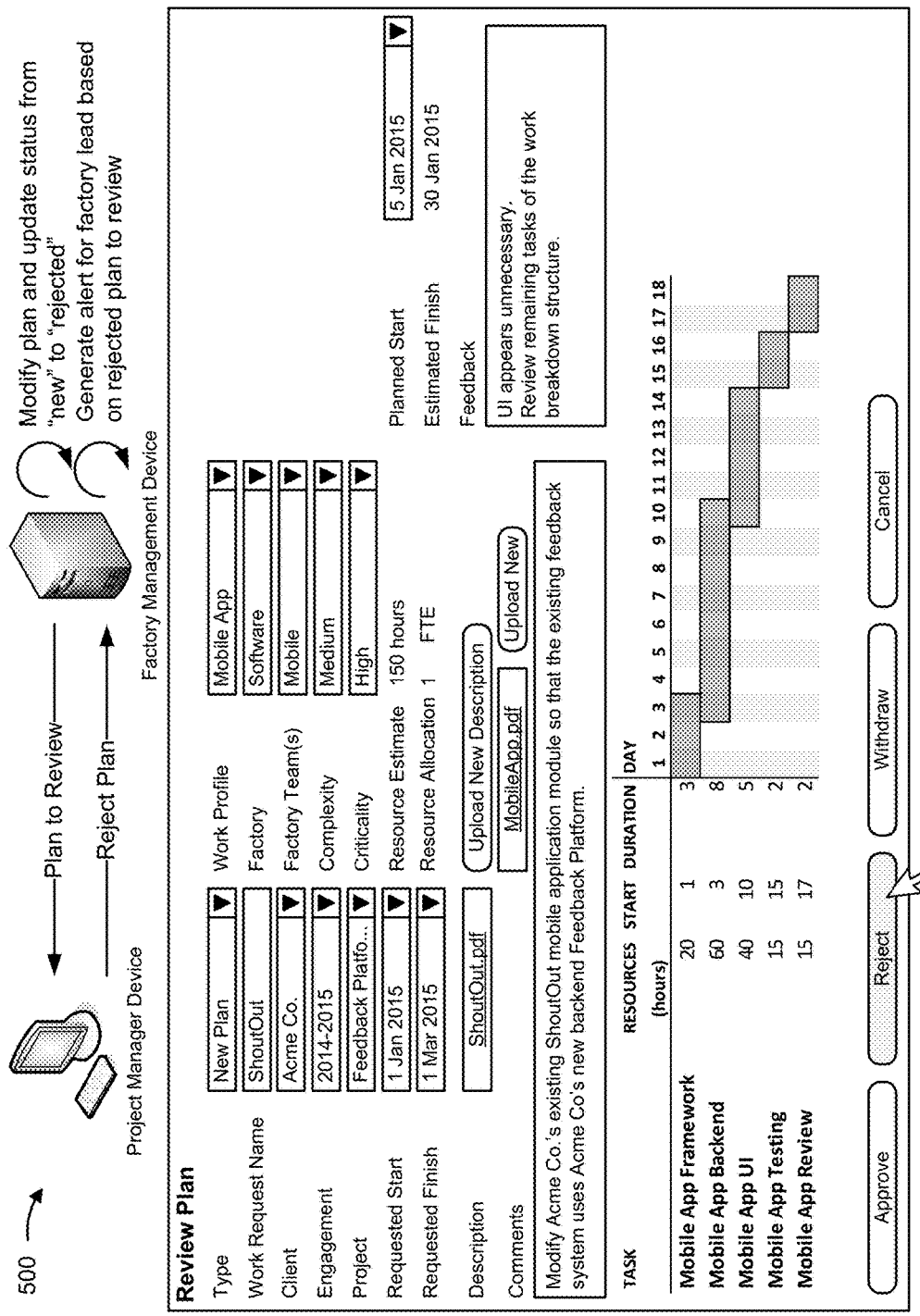

As shown in FIG. 5C, assume, for example implementation 500, that the factory management device provides, to the project manager device, a response (e.g., "Plan to Review") based on the request. Assume further that, based on the response, the project manager device presents, for display to the project manager, a user interface (e.g., "Review Plan") associated with reviewing a plan for a work request (e.g., the plan and corresponding work request of FIG. 5A). The user interface presents, both numerically and graphically, an order, resource demand, and duration for tasks associated with the work request (e.g., "Mobile App Framework," "Mobile App Backend," "Mobile App UI," "Mobile App Testing," and "Mobile App Review"). The user interface further presents a contractual resource allocation commitment associated with performing the work (e.g., "1 FTE"—i.e., equivalent to one full time resource).

Assume that the user interface presents options associated with reviewing the plan (e.g., "Accept," "Reject," "Withdraw," or "Cancel") and an estimated finish (e.g., "30 Jan. 2015") based on the resource estimate, the resource allocation, and input from the project manager identifying a planned start (e.g., "5 Jan. 2015"). Assume further that the project manager provides feedback to the user interface ("UI appears unnecessary. Review remaining tasks of the work breakdown structure") and directs the project manager device to reject the plan (e.g., by selecting the "Reject" button). The project manager device sends, to the factory management device, information associated with the project manager's rejection of the plan, and the factory management device, based on the information, updates the status information associated with the plan (e.g., from "new" to "rejected") and modifies the plan to include the project manager's planned start and feedback. The factory management device further generates an alert for a factory lead, associated with the "Software" factory, to review the rejected plan.

Figure 5D:
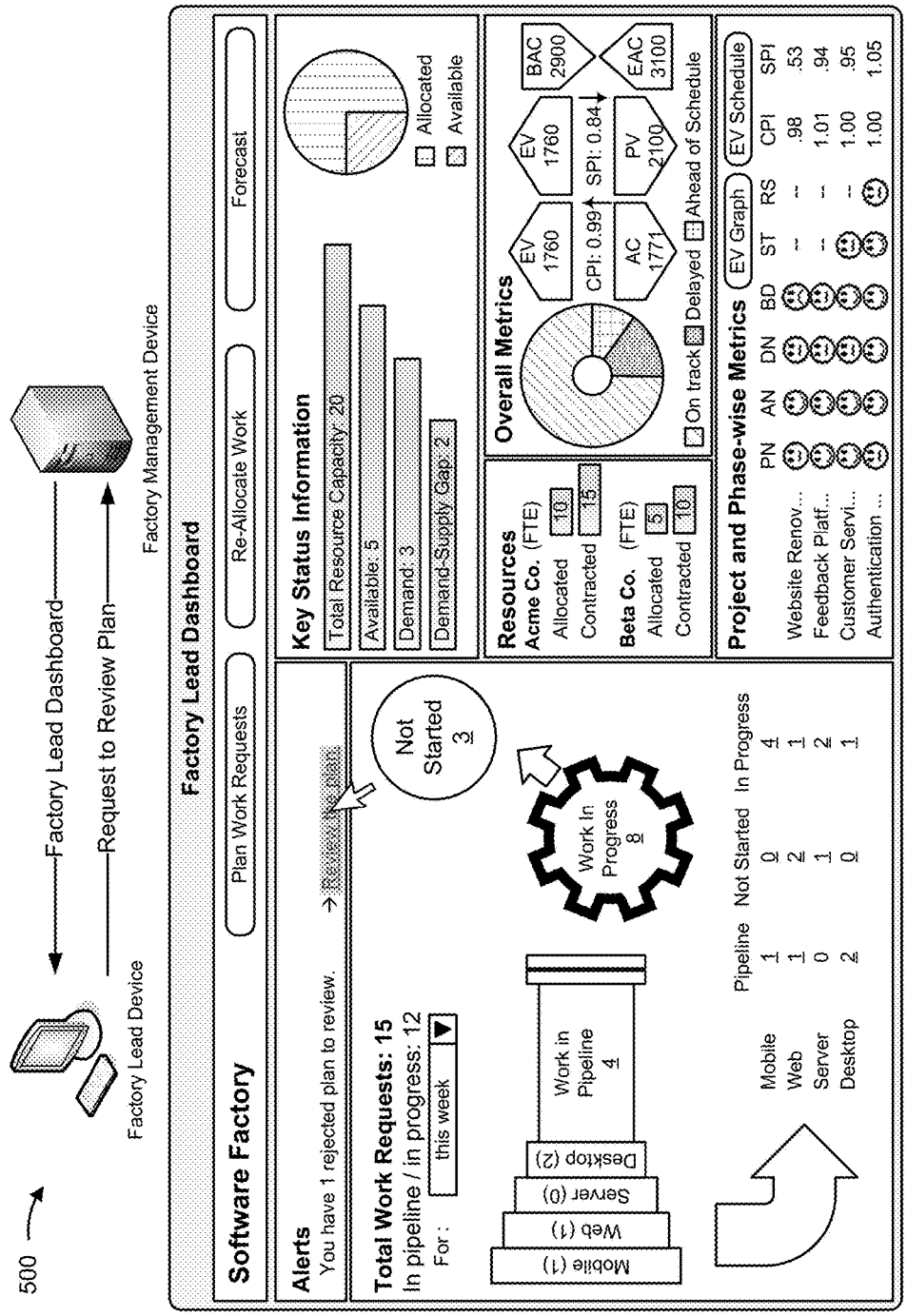

As shown in FIG. 5D, assume, for example implementation 500, that a factory lead device (e.g., factory lead device 242), requests, from the factory management device, information associated with presenting, to the factory lead, a factory lead dashboard. Based on the request, the factory management device provides, to the factory lead device, status update information, metric information, schedule information, and alert information associated with the factory lead and the "Software" factory.

Assume that the status update information includes information for presenting, within the factory lead dashboard, a "Total Work Requests" section, a "Key Status Information" section, and a "Resources" section. The "Total Work Requests" section indicates work requests for which action is expected during a particular time period (e.g., "this week"). The "Total Work Requests" section presents, graphically: a pipeline indicating quantities (total and by factory resource team) of planned, but unscheduled, work requests; a gear indicating a quantity of started, but unfinished work requests; and a circle indicating a quantity of scheduled, but not started, work requests. The "Total Work Requests" section further presents a table indicating quantities, by factory resource team, of work requests which are in the pipeline, in progress, or which are to be started during the particular time period. The "Key Status Information" section indicates, numerically and graphically (e.g., as a bar graph and a piece chart), a total resource capacity, an available resource capacity, a resource demand, and a resulting demand-supply gap. The "Resources" section may indicate allocated and contracted resource quantities (e.g., represented as FTE) for clients (e.g., "Acme Co." and "Beta Co.").

Assume that the metric information includes information for presenting, within the factory lead dashboard, a "Project and Phase-wise Metrics" section and an "Overall Metrics" section. The "Project and Phase-wise Metrics" section identifies projects associated with the factory and indicates an SPI range (e.g., represented as happy, sad, and/or ambivalent expressions corresponding to particular SPI ranges) associated with phases of the projects (e.g., PN=Plan, AN=Analyze, DN=Design, BD=Build, ST=Test, and RS=Release). The "Project and Phase-wise Metrics" section also indicates an overall CPI and SPI associated with the projects and provides the factory lead with an option to display an EV graph (e.g., a project and/or phase-wise graph representing earned value, expressed in currency or resource effort, as a function of time) or an EV schedule (e.g., a project and/or phase-wise graph representing earned value, expressed in a time domain, as a function of time). The "Overall Metrics" section indicates an overall EAC, BAC, AC, EV, PV, CPI, and SPI associated with the factory. The "Overall Metrics" section also represents overall factory progress (e.g., as a pie chart classifying work based on SPI ranges associated with being "on track," "delayed," or "ahead of schedule").

Assume that the alert information includes information for presenting, within the factory lead dashboard, an "Alert" section. The "Alert" section indicates an alert (e.g., "You have 1 rejected plan to review.") and a corresponding suggested action (e.g., "Review the plan.").

Assume further that particular portions of information (e.g., buttons and underlined text) presented within the factory lead dashboard may be selected (e.g., based on user input) to send, from the factory lead device to the factory management device, a request for additional information associated with the particular selected portion. Assume further that the factory lead selects the suggested action identified within the "Alert" section, and the factory lead device provides a corresponding request (e.g., "Request to Review Plan") to the factory management device.

Figure 5E:
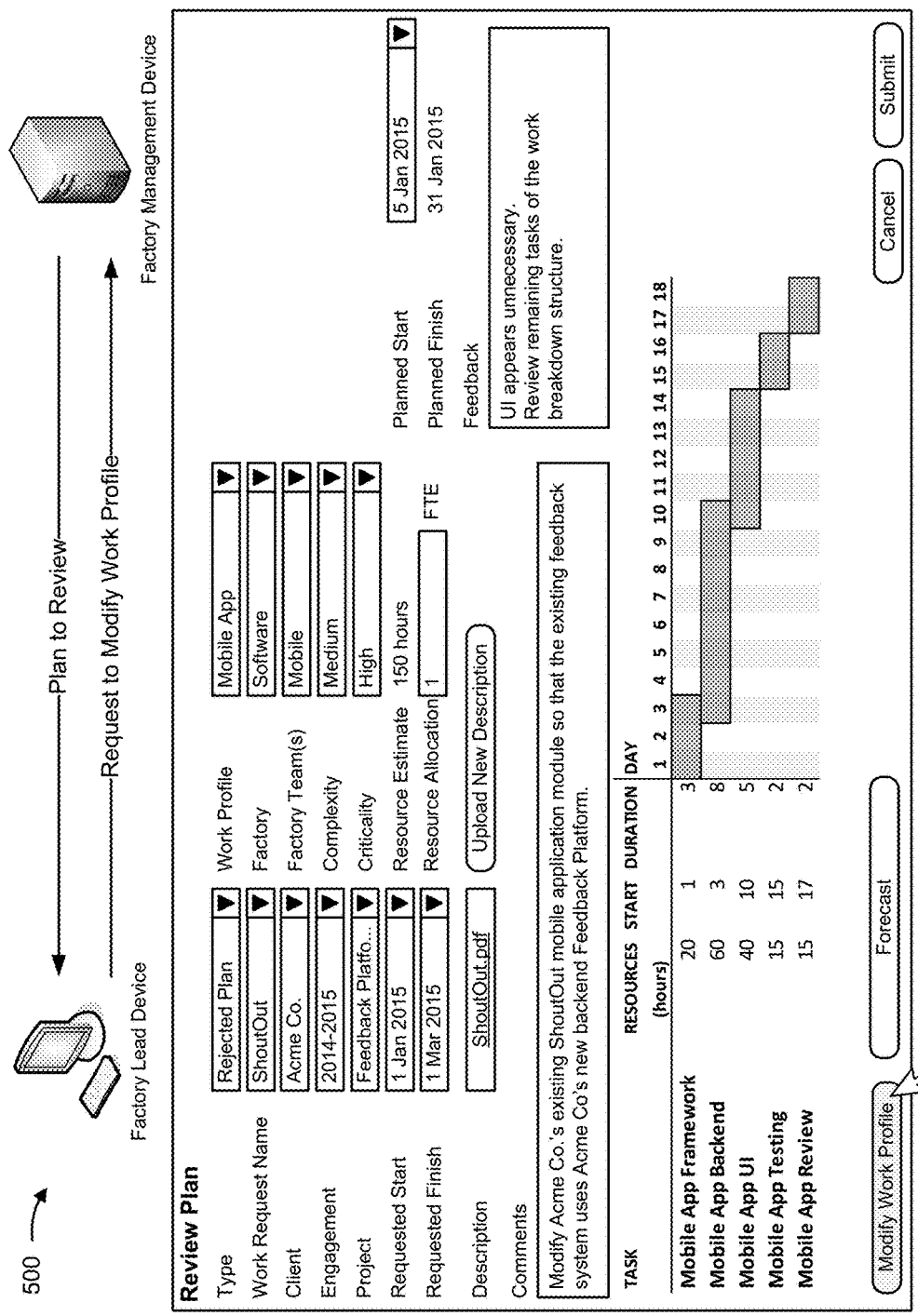

As shown in FIG. 5E, assume, for example implementation 500, that the factory management device provides, to the factory lead device, a response (e.g., "Plan to Review") based on the request. Assume further that, based on the response, the factory lead device presents, for display to the factory lead, a user interface (e.g., "Review Plan") associated with reviewing a plan for a work request (e.g., the plan and corresponding work request of FIG. 5A). The user interface presents the same information, including the feedback, presented by the project manager device user interface (as described with respect to FIG. 5C). However, the user interface presents options, different from those presented to the project manager, associated with reviewing the plan (e.g., "Modify Work Profile," "Forecast," "Cancel," and "Submit").

Assume further that the factory lead directs the factory lead device to modify the work profile associated with generating the plan (e.g., by selecting the "Modify Work Profile" button). The factory lead device sends, to the factory management device, information associated with the project manager's request to modify the work profile.

Figure 5F:
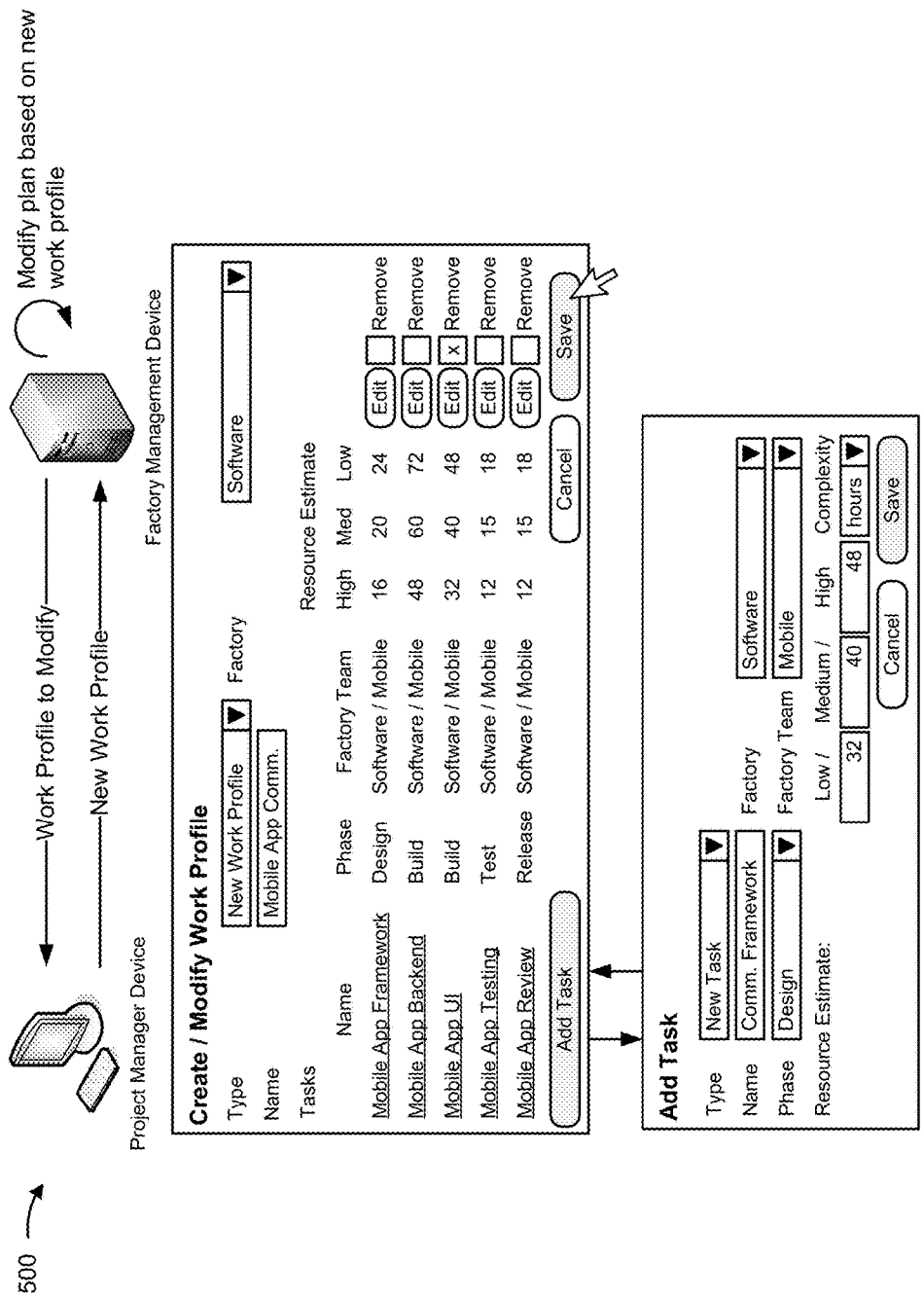

As shown in FIG. 5F, assume, for example implementation 500, that, based on the request, the factory management device provides, to the factory lead device, information associated with modifying the work profile associated with the ShoutOut plan. The factory lead device presents, for display to the factory lead, a user interface associated with creating and/or modifying the work profile. The user interface includes a list of tasks associated with the work profile, phases associated with the tasks, factory teams associated with performing the tasks, and resource estimate quantities (e.g., expressed in hours) associated with different complexity levels of each task (e.g., high, medium, or low). The user interface also includes options for identifying a work profile type (e.g., new or existing), a work profile name (e.g., "Mobile App Comm."), and a factory (e.g., "Software"); options for adding, editing, and removing tasks; and options for saving and canceling changes to the work profile.

Assume that the factory lead identifies the work profile as being a new work profile, provides a name (e.g., "Mobile App Comm."), removes one task (e.g., "Mobile App UI"), and adds a new task. Assume that the factory lead defines the new task by identifying a name (e.g., "Comm. Framework"), a phase (e.g., Design), a factory (e.g., "Software"), a factory team (e.g., "Mobile"), and resource estimates associated with low, medium, and high complexity levels (e.g., 32, 40, and 48 hours). Assume that the factory lead directs the factory lead device to save the new task and the new work profile (e.g., by selecting corresponding "Save" buttons). Factory lead device may provide information, associated with the new task and new plan, to the factory management device. The factory management device may modify the plan based on the new work plan.

Figure 5G:
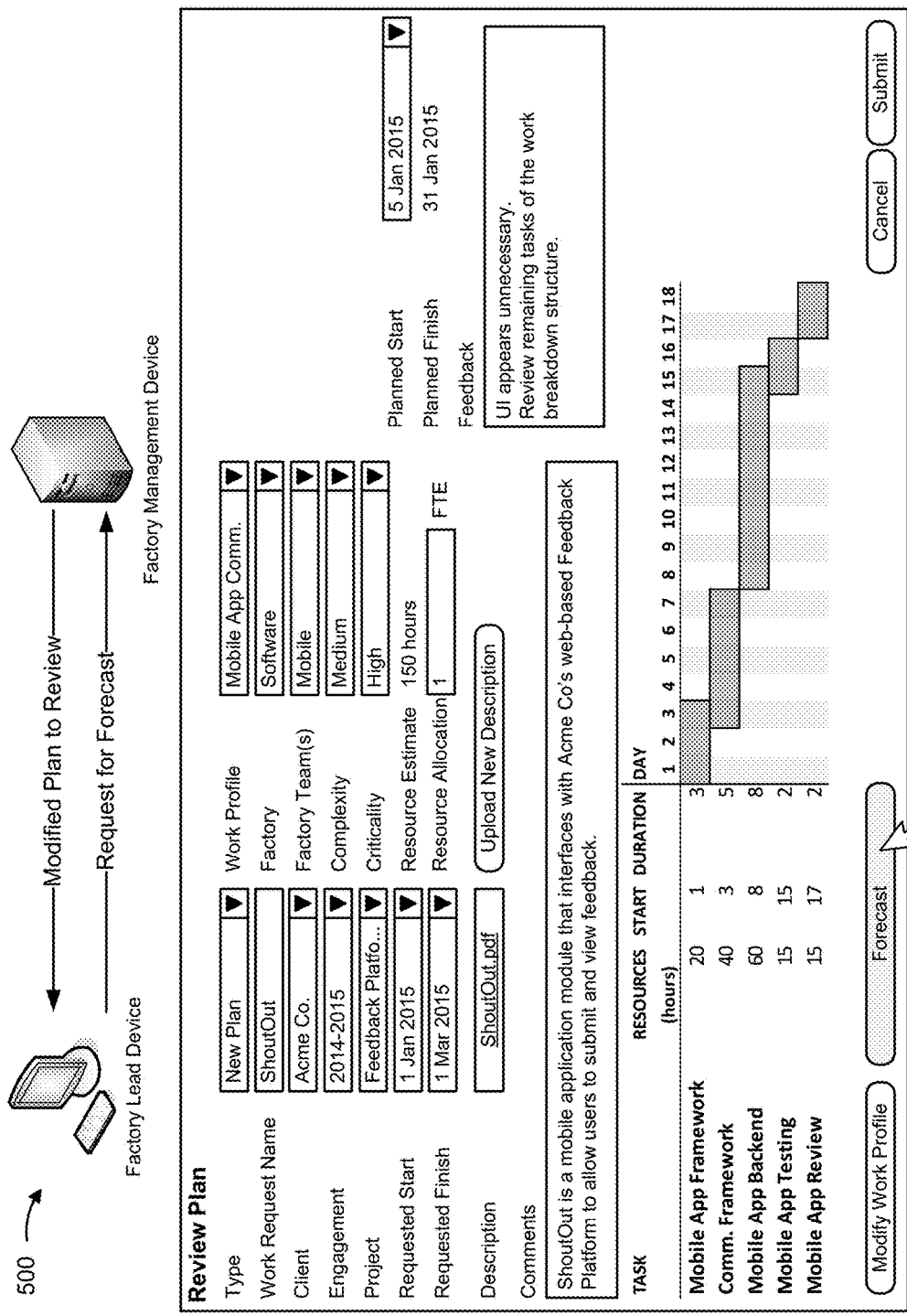

As shown in FIG. 5G, assume, for example implementation 500, that, after saving the new work profile, the factory management device sends, to the factory lead device, the modified plan for review. The factory lead device presents, for display to the factory lead, a user interface (e.g., "Review Plan") associated with reviewing a plan for a work request (e.g., the updated plan). Assume that the factory lead directs the factory lead device to request forecast information (e.g., by selecting the "Forecast" button). The factory lead device sends, to the factory management device, information associated with the project manager's request for a forecast.

Figure 5H:
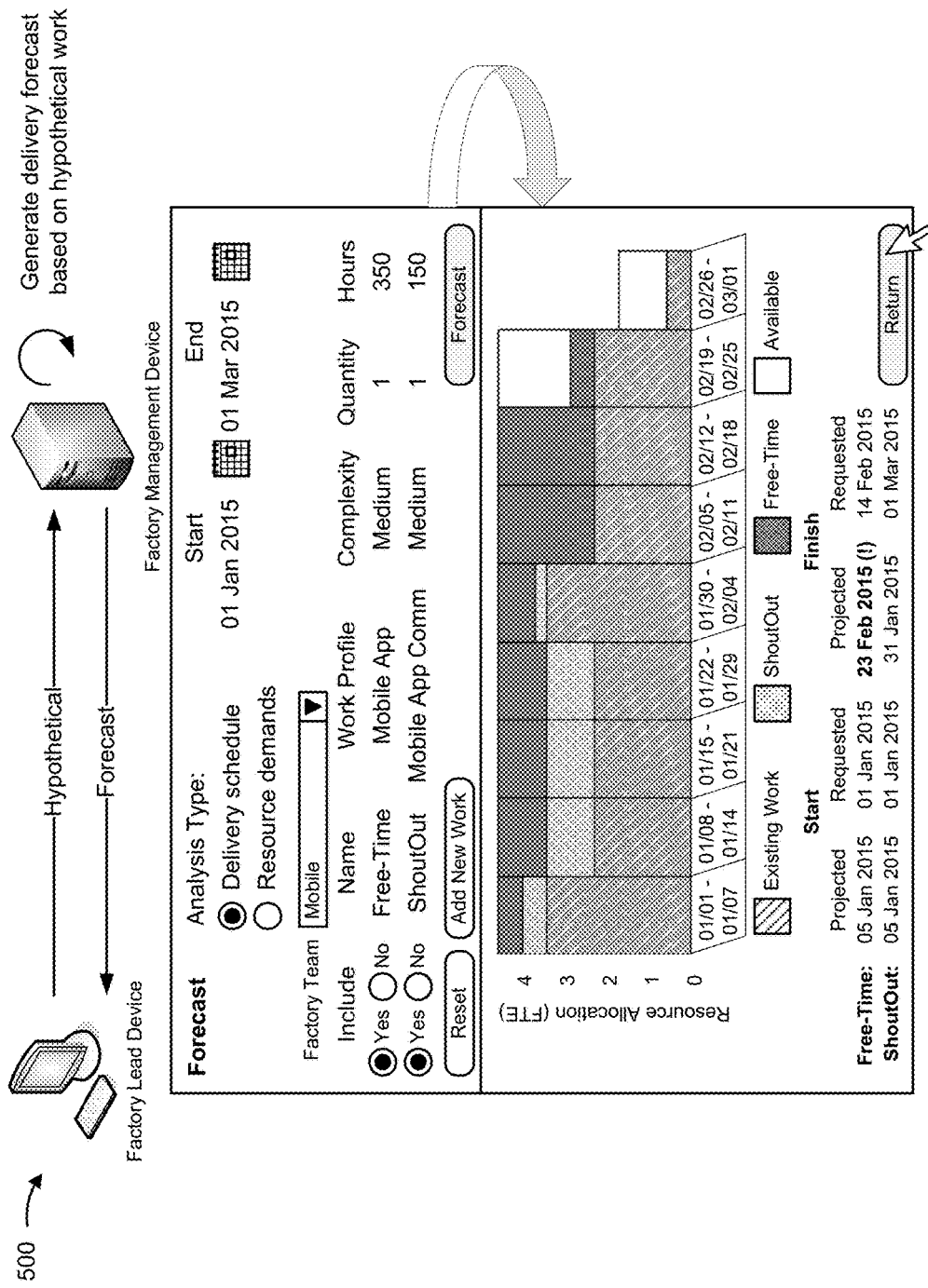

As shown in FIG. 5H, assume, for example implementation 500, that, based on the request, the factory management device provides, to the factory lead device, information associated with generating a forecast. Assume that the factory lead selects, based on options presented by the factory lead device, an analysis type (e.g., "Delivery schedule" or "Resource demands"), start and end dates (e.g., "1 Jan. 2015" and "1 Mar. 2015," respectively), a factory team (e.g., "Mobile"), and work requests to include in the hypothetical (e.g., "Free-Time," "ShoutOut," and a button to add new work). Assume that the factory lead device sends (e.g., based on the factory lead selecting a "Forecast" button) information, based on the factory lead's selections identifying the hypothetical, to the factory management device.

The factory management device generates a forecast, based on the hypothetical, and sends information associated with presenting the forecast for display to the factory lead. The factory lead device presents the forecast as a graph (e.g., a 100% stacked bar graph) illustrating time-dependent projected quantities of available resources and allocated resources by work request (e.g., Existing Work, ShoutOut, and Free-Time). The factory lead device also presents projected and requested start and finish dates for work requests included in the hypothetical. The factory lead device provides an alert associated with a work request (e.g., "Free-Time") whose projected finish date is beyond the requested finish date (e.g., by bolding text and displaying an exclamation mark).

Figure 5I:
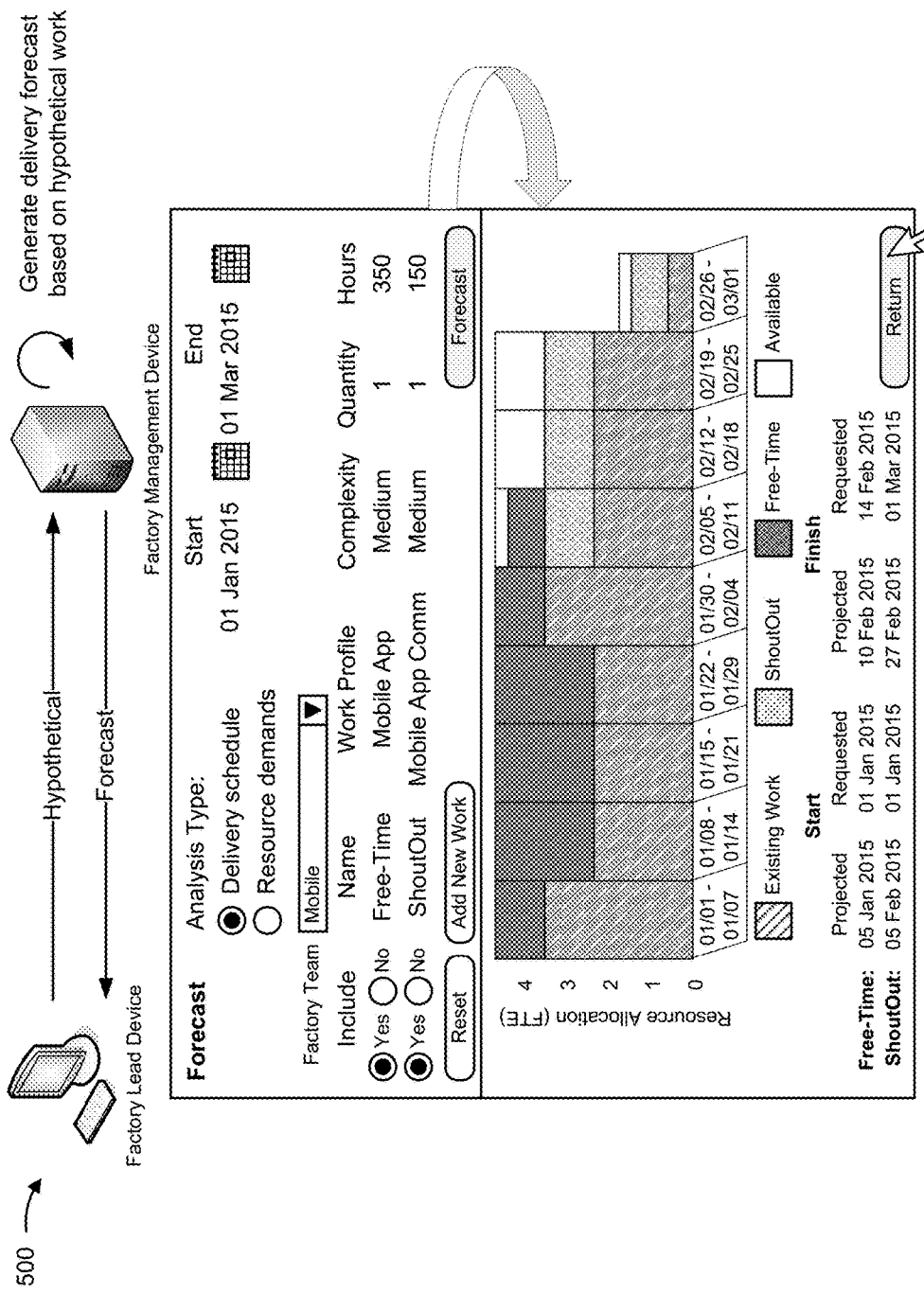

As shown in FIG. 5I, assume, for example implementation 500, that the factory lead returns to the user interface associated with modifying the ShoutOut plan, changes the estimated start date (e.g., by from "5 Jan. 2015" to "5 Feb. 2015"), and requests another forecast from the factory management device (as described with respect to FIG. 5H). Assume that, based on the new start date, the forecast generated by the factory management device projects that each of the Free-Time and ShoutOut projects will finish prior to the respective project's requested finish date.

Figure 5J:
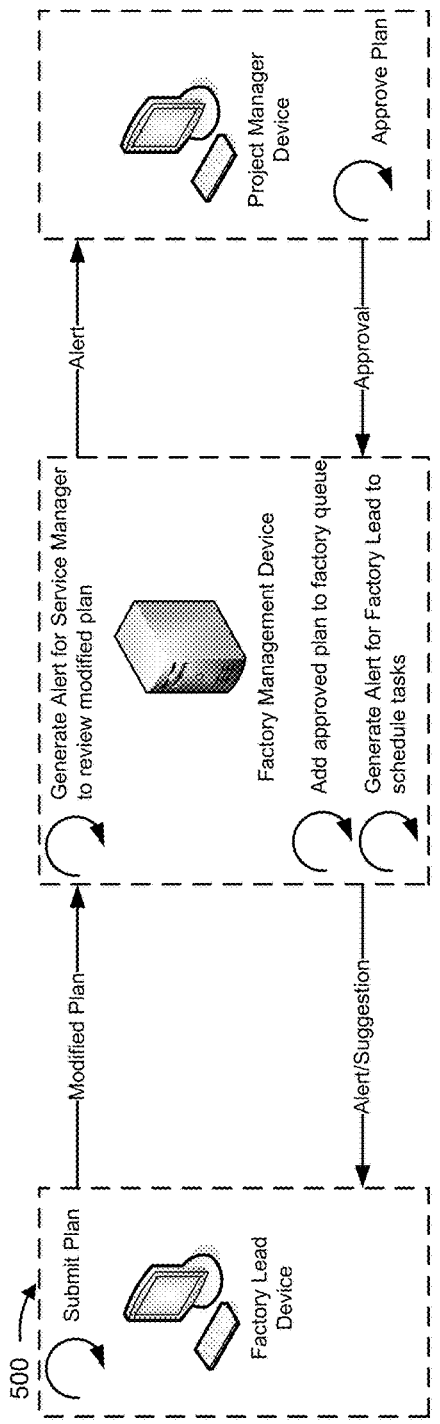

As shown in FIG. 5J, assume, for example implementation 500, that the factory lead device submits the modified plan to the factory management device. The factory management device generates an alert for the service manager to review the modified plan and provides the alert to the project manager device. The project manager reviews and approves the plan and returns an approval to the factory management device. The factory management device adds the approved plan to the factory queue, generates an alert for the factory lead to schedule tasks associated with the plan, and provides the alert to the factory lead device for presentation to the factory lead.

Figure 5K:
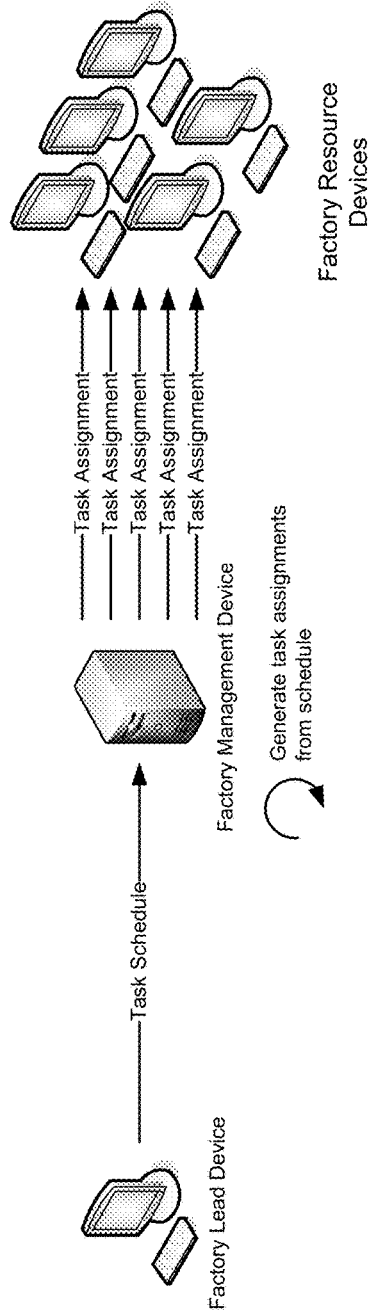

As shown in FIG. 5K, assume, for example implementation 500, that the factory lead device provides a task schedule to the factory management device. The factory management device generates task assignments, based on the schedule, and provides the task assignments to corresponding factory resource devices (e.g., factory resource devices 246).

Figure 5L:
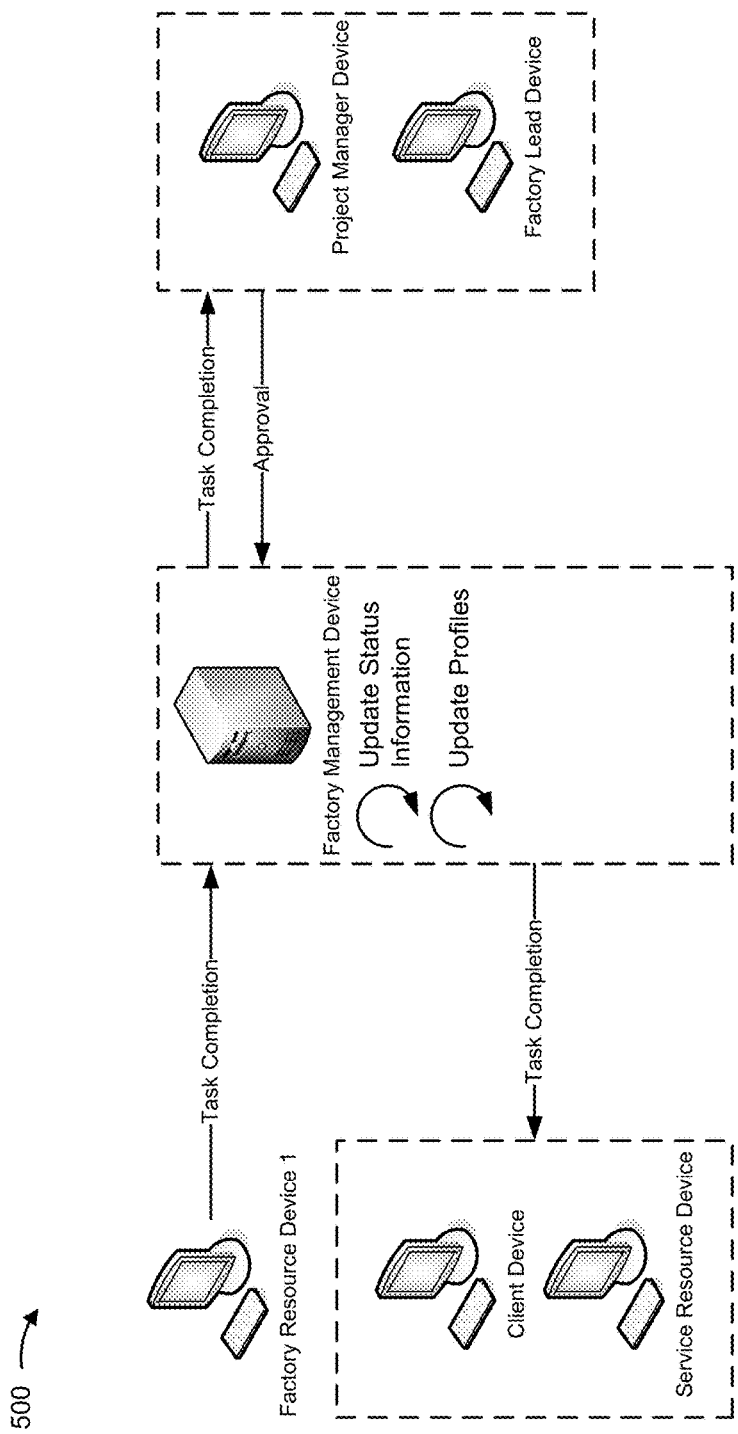

As shown in FIG. 5L, assume, for example implementation 500, that a factory resource, associated with a particular factory resource device (shown as "Factory Resource Device 1"), completes an assigned task and provides, to the factory management device, status update identifying the task as complete. The factory management device provides the task completion status update to the project manager device and to the factory lead device, and receives an approval from the project manager device and/or the factory lead device. Based on the approved status update, the factory management device updates status information and one or more profiles (e.g., a task profile) associated with the task. Based on updating the status information, the factory management device provides a task completion status update to the client device and to the service resource device.

As indicated above, FIGS. 5A-5L are provided merely as an example. Other examples are possible and may differ from what was described with regard to FIGS. 5A-5L.

Implementations of a factory management device described herein may automate and/or simplify the generation of work requests, planning of work requests, allocation of factory resources, scheduling of plans, assignment of tasks, updating of status information, provision of progress and/or performance metrics, and forecasting resource demands and/or delivery schedules. The factory management device may thus increase value created by the factory, by simplifying day-to-day tasks and increasing efficiency in the provision and allocation of resources, while simultaneously providing increased transparency of the factory's progress, performance, and operating status.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Alternatively, or additionally, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories;
a factory management interface,
the factory management interface for receiving user input associated with a work request; and
one or more processors, communicatively coupled to the one or more memories, to:
receive information associated with the work request;
identify a work profile associated with the work request,
the work profile being associated with generating a plan for a group of tasks to be performed in fulfilling the work request;
identify a group of task profiles associated with the group of tasks,
the group of task profiles identifying:
a group of resources associated with performing the group of tasks, and
parameters associated with estimating a resource demand for performing the group of tasks by the group of resources;
generate a plan, associated with the work request, based on the work profile and the group of task profiles,
the plan identifying the group of tasks, an order for performing the group of tasks, and an estimated resource demand associated with performing the group of tasks;
determine a score associated with the plan,
the plan being approved based on determining whether the score satisfies a threshold;
provide, to a resource device associated with the group of resources, an assignment based on the plan being approved,
the assignment identifying a task from the group of tasks;
receive, from the resource device, a completion update, the completion update identifying the task and a completion status associated with the task;
update status information based on the completion update;
output a status update based on the status information;
receive, from the resource device, feedback associated with actual values for performing the task; and
automatically adjust the estimated resource demand associated with performing the group of tasks based upon the feedback associated with the actual values.

2. The device of claim 1, where the one or more processors are further to:
receive information associated with a hypothetical factory resource demand;
identify an actual factory resource capacity;
determine, based on the actual factory resource capacity, a forecast schedule associated with the hypothetical factory resource demand; and
output the forecast schedule for display.

3. The device of claim 1, where the one or more processors are further to:
receive information associated with a hypothetical factory delivery schedule;
determine a forecast factory resource capacity associated with satisfying the hypothetical factory delivery schedule; and
output the forecast factory resource capacity for presentation to a user.

4. The device of claim 1, where the one or more processors are further to:
determine, based on the status information, one or more metrics associated with a progress or a performance of the work request; and
provide the one or more metrics for display.

5. The device of claim 1, where the one or more processors are further to:
determine, based on the status information, one or more issues associated with fulfilling the work request;
determine, based on the one or more issues, one or more actions associated with resolving the one or more issues; and
output an alert, identifying the one or more issues and the one or more actions, for display.

6. The device of claim 1, where the one or more processors, when identifying the work profile, are further to:
determine whether an existing work profile, from a group of work profiles, is associated with the work request,
the work profile being the existing work profile based on determining that the existing work profile is associated with the work request, and
the work profile being a new work profile based on determining that the existing work profile is not associated with the work request.

7. The device of claim 1, where the one or more processors, when generating the plan, are further to:
adjust, based on the work profile, the parameters for determining the estimated resource demand; and
determine the estimated resource demand based on the adjusted parameters.

8. A computer-readable medium storing instructions, the instructions comprising:
one or more instructions that, when executed by one or more processors, cause the one or more processors to:
obtain work information associated with a work request via a factory management interface,
the factory management interface for receiving user input associated with the work request;
generate a plan to satisfy the work request,
the plan identifying:

a group of tasks to satisfy the work request,
the group of tasks being identified and organized according to work profile information associated with the work request,
a resource to complete the group of tasks,
the resource being identified according to task profile information associated with the group of tasks,
an estimated demand associated with the resource completing the group of tasks,
the estimated demand being determined based on a set of parameters associated with the work profile information and the task profile information;
generate a score associated with an ability of a supply of the resource to satisfy the estimated demand;
determine that the plan is to be approved based on the score satisfying a threshold;
determine a demand associated with completing another group of tasks by the resource,
the other group of tasks being identified in a schedule,
the other group of tasks being associated with the work profile information and the task profile information, and
the demand being determined based on a set of demand parameters;
determine a capacity associated with completing tasks by the resource,
the capacity being determined based on a set of capacity parameters associated with resource profile information,
the resource profile information being associated with the resource;
determine, based on the capacity and the demand, a supply associated with the resource;
provide, for presentation to a user, planning information,
the planning information being associated with the plan, the schedule, the capacity, the supply, the demand, and the estimated demand;
receive feedback associated with actual values for performing the task; and
automatically adjust the estimated demand associated with performing the group of tasks based upon the feedback associated with the actual values.

9. The computer-readable medium of claim 8, where the one or more instructions, when executed by the one or more processors, further cause the one or more processors to:
determine, based on the schedule, a group of metric values associated with quantifying a progress or a performance of the resource,
the planning information being associated with the group of metric values.

10. The computer-readable medium of claim 8, where the one or more instructions, when executed by the one or more processors, further cause the one or more processors to:
determine, based on the schedule, an alert associated with the user; and
determine a suggested action associated with the alert,
the planning information identifying the alert and the suggested action.

11. The computer-readable medium of claim 8, where the one or more instructions, when executed by the one or more processors, further cause the one or more processors to:
determine whether the plan is approved,
the planning information being associated with a queue,
the queue identifying a group of approved plans,
the plan being included in the group of approved plans based on determining that the plan is approved.

12. The computer-readable medium of claim 8, where the one or more instructions, when executed by the one or more processors, further cause the one or more processors to:
determine whether the plan is to be scheduled;
provide, for presentation to the resource, assignment information associated with the schedule,
the schedule identifying, based on determining that the plan is to be scheduled:
the group of tasks,
the resource,
a group of start dates, and
a group of end dates,
the group of start dates and the group of end dates being determined based on the supply, the demand, and the estimated demand.

13. A method, comprising:
receiving, by a device and via a user interface, input information associated with a work request;
determining, by the device, a resource associated with the work request;
determining, by the device, a demand on the resource to perform the work request;
determining, by the device, other demands on the resource to perform planned work requests;
determining, by the device, an assignment of the resource to perform a group of tasks assigned to the resource,
the assignment identifying a task from the group of tasks to be performed,
the group of tasks being associated with scheduled work requests;
determining, by the device, a status associated with the scheduled work requests;
determining, by the device, one or more metrics for measuring a progress or performance associated with the resource;
providing, by the device and for presentation via the user interface, output information associated with:
the demand,
the other demands,
the assignment,
the one or more metrics, and
the status;
receiving, by the device, feedback associated with actual values for performing the task; and
automatically adjusting, by the device, the demand associated with performing the group of tasks based upon the feedback associated with the actual values.

14. The method of claim 13, where determining the assignment and the status further comprises:
receiving a status update associated with the resource,
the status update identifying the task as completed.

15. The method of claim 13, where determining the demand further comprises:
identifying a work profile associated with the work request,
the work profile identifying a particular group of tasks and a set of work parameters;
identifying a group of task profiles corresponding to the group of tasks,
the group of task profiles identifying a set of task parameters; and determining the demand based on the set of work parameters and the set of task parameters.

16. The method of claim 13, further comprising:

determining, based on the input information, whether the work request is associated with a hypothetical factory resource demand;

identifying an actual factory resource capacity;

determining, based on the actual factory resource capacity, a forecast schedule associated with the hypothetical factory resource demand; and outputting the forecast schedule for display.

17. The method of claim 13, further comprising:

generating, by the device, a plan to satisfy the work request;

generating, by the device, one or more scores associated with the plan; and determining, by the device, that the plan is to be approved based on the one or more scores satisfying a threshold.

18. The method of claim 17, where the one or more scores are associated with whether the work request matches a known work profile.

19. The method of claim 13, further comprising:

receiving information associated with a hypothetical factory delivery schedule;

determining a forecast factory resource capacity associated with satisfying the hypothetical factory delivery schedule; and outputting the forecast factory resource capacity for presentation to a user.

20. The method of claim 13, further comprising:

determining, based on the status, one or more metrics associated with a progress or a performance of the work request; and provide the one or more metrics for display.

* * * * *